(12) United States Patent
Patel

(10) Patent No.: US 10,353,941 B2
(45) Date of Patent: Jul. 16, 2019

(54) SYSTEMS AND METHODS FOR CONTENT PLACEMENT, RETRIEVAL AND MANAGEMENT BASED ON GEOLOCATION AND OTHER PARAMETERS

(71) Applicant: Tip Vyspots LLC Vy, Chicago, IL (US)

(72) Inventor: Roopit Patel, Chicago, IL (US)

(73) Assignee: Tip Vyspots LLC Vy, Chicago, IL (US)

( * ) Notice: Subject to any disclaimer, the term of this patent is extended or adjusted under 35 U.S.C. 154(b) by 0 days.

(21) Appl. No.: 15/835,702

(22) Filed: Dec. 8, 2017

(65) Prior Publication Data

US 2018/0095995 A1 Apr. 5, 2018

Related U.S. Application Data

(63) Continuation of application No. 15/814,122, filed on Nov. 15, 2017, now Pat. No. 10,176,195, which is a continuation-in-part of application No. 15/687,235, filed on Aug. 25, 2017, now abandoned, and a continuation-in-part of application No. 15/053,734, filed on Feb. 25, 2016.

(51) Int. Cl.
| | |
|---|---|
| *G06F 17/30* | (2006.01) |
| *G06F 16/38* | (2019.01) |
| *G06F 16/29* | (2019.01) |
| *G06F 16/9537* | (2019.01) |
| *G06F 16/387* | (2019.01) |
| *H04W 4/021* | (2018.01) |
| *G06Q 30/02* | (2012.01) |
| *H04W 4/02* | (2018.01) |

(52) U.S. Cl.
CPC .............. *G06F 16/38* (2019.01); *G06F 16/29* (2019.01); *G06F 16/387* (2019.01); *G06F 16/9537* (2019.01); *G06Q 30/0261* (2013.01); *H04W 4/02* (2013.01); *H04W 4/021* (2013.01)

(58) Field of Classification Search
CPC ....... H04W 4/021; H04W 4/21; H04W 4/029; H04W 4/023; G06F 17/30241; G06F 17/3087; G06F 17/30038; G06F 17/30041; G06F 17/30044; G06F 17/30598; G06F 16/29; G06F 16/9537; G06F 16/285; G06F 16/48; G06F 16/487; G06F 16/387

USPC ................ 707/736, 737, 740, 754, 919, 921

See application file for complete search history.

(56) References Cited

U.S. PATENT DOCUMENTS

| | | | |
|---|---|---|---|
| 8,755,824 B1 * | 6/2014 | Wang | H04W 4/021 455/456.3 |
| 9,140,569 B2 * | 9/2015 | Ellanti | G01C 21/3438 |
| 9,338,759 B2 * | 5/2016 | Chowdhury | H04W 64/00 |
| 9,498,163 B2 * | 11/2016 | Frieder | G06F 16/9535 |

(Continued)

*Primary Examiner* — Dangelino N Gortayo
(74) *Attorney, Agent, or Firm* — Scherrer Patent & Trademark Law, P.C.; Stephen T. Scherrer; Monique A. Morneault

(57) ABSTRACT

The present invention is in the technical field of geolocation. More particularly, the present invention is in the technical field of making content in the form of electronic data available for retrieval when a device has satisfied the Retrieval Range and other Rules which govern the ability to retrieve the content. Retrieval of Content by user devices may be based on Rules communicated by an App, Admin or third party interface and shall be contained and processed by an application interface engine.

17 Claims, 23 Drawing Sheets

(56) References Cited

U.S. PATENT DOCUMENTS

| | | | | |
|---|---|---|---|---|
| 2013/0282421 A1* | 10/2013 | Graff | ............... | G06Q 10/1093 |
| | | | | 705/7.18 |
| 2014/0351411 A1* | 11/2014 | Woods | ............... | H04W 4/021 |
| | | | | 709/224 |
| 2015/0058345 A1* | 2/2015 | Mishra | ............. | G06F 17/30241 |
| | | | | 707/737 |
| 2016/0034712 A1* | 2/2016 | Patton | ............... | H04W 4/21 |
| | | | | 726/28 |
| 2016/0088436 A1* | 3/2016 | Goss | ............... | H04W 4/021 |
| | | | | 701/409 |

\* cited by examiner

SYSTEMS AND METHODS FOR CONTENT PLACEMENT, RETRIEVAL AND MANAGEMENT BASED ON GEOLOCATION AND OTHER PARAMETERS

TECHNICAL FIELD

The present invention is in the technical field of geolocation. More particularly, the present invention is in the technical field of making Content in the form of electronic data (hence forth "Content") available for Retrieval when respective Retrieval has satisfied the Retrieval Range and within the criteria of Rules which govern the ability to Retrieve the Content. Retrieval of Content by User Devices may be based on Rules communicated by App, Admin or third party interface and shall be contained and processed by an APIE (defined herein).

BACKGROUND

As portable internet-connected devices, such as mobile phones, tablets, and laptops (aka User Devices), continue to evolve to provide Content to users, the opportunity to share and distribute Content increases. In one situation, Content can be Placed and its Retrieval controlled by explicitly determining the recipients, perhaps by email address, account identifier or by another unique identifier, and transmitted directly to the User Device. In another situation, Content can be Placed and its Retrieval controlled by specifying an access code which only valid recipients know. Typically, the User Device placing the Content has distributed this access code manually or through an electronic communication to the intended recipient(s). In another example, the User Device placing the Content leaves the Content open to all users for Retrieval, with other Rules or no Rules applied.

A need exists for Content to be Retrievable based on location. Specifically, a need exists for system and methods that allow for the Retrieval of digital content based on a user's physical Geolocation.

Moreover, a need exists for Content to be Placed by a user so as to be accessible by others when others are at or near the location of the Placed Content. Specifically, a need exists for Content to be Placed and for Retrieval Rules to be associated with the Placed Content.

Moreover, a need exists for Content to be Retrievable when a user is within a pre-defined range of the Geolocation of the Content. More specifically, a need exists for systems and methods that allow users to Retrieve Content when within the pre-defined range of the Geolocation of the Content, and that otherwise satisfies one or more other Rules for Retrieval.

SUMMARY

The present invention is a technology allowing the Placement and Retrieval of Content at a specific physical location. Particularly, the present invention is in the technical field of making Content available for User Device Retrieval when Retrieval is requested after satisfying the Geo Place Rules and any other Rules required to Retrieve such Content. Even more particularly, the present invention relates to an APIE for placing Content into a Geo Place and with Retrieval Rules, Retrieving all applicable Content. The APIE is an "engine" and a "platform" that is also for third party applications to use similar to the App through APIs. Content Placement can specify one or more Retrieval Rules for the Content to be Retrieved.

To this end, in an embodiment of the present invention, a system for associating digital content with a physical location is provided.

It is, therefore, an advantage and objective of the present invention to provide systems and methods for allowing Content to be Retrievable based on location.

Specifically, it is an advantage and objective of the present invention to provide system and methods that allow for the Retrieval of digital Content based on a user's physical Geolocation.

Moreover, it is an advantage and objective of the present invention to provide systems and methods that allow Content to be Placed by a user so as to be accessible by others when others are at or near the location of the Placed Content.

Specifically, it is an advantage and objective of the present invention to provide systems and methods that allow Content to be Placed and for Retrieval Rules to be associated with the Placed Content.

Moreover, it is an advantage and objective of the present invention to provide systems and methods that allow Content to be Retrievable when a user is within a pre-defined range of the Geolocation of the Content.

More specifically, it is an advantage and objective of the present invention to provide systems and methods that allow users to Retrieve Content when within the pre-defined range of the Geolocation of the Content, and that otherwise satisfies one or more other Rules for Retrieval.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

Figure 1:
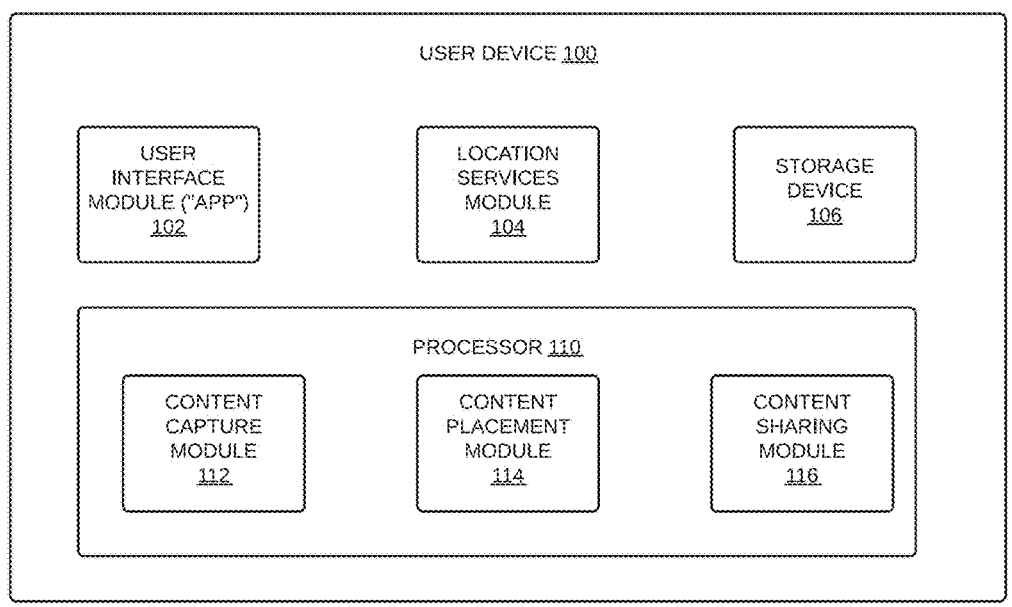
FIG. 1 is a block diagram illustrating one example embodiment of a User Device.

The present invention is a technology allowing the Placement and Retrieval of Content once a User Device has satisfied the Geo Place Rules and any other Rules and parameters required by the APIE. Referring now to the invention in more detail, wherein like numerals refer to like parts. The Content may be Retrievable by a user using a User Device (as defined herein) via an App, via website, via a third party application; or as otherwise apparent to one of ordinary skill in the art.

Definitions

Application Programming Interface Exchange (APIE): An engine and platform in which the exchange for an Application Programming Interface and electronic software applications communicate and process, which may use computer devices, servers, databases, programs, storages, Apps, Admins and User Devices.

Application (App): The electronic software that is local to a User Device that processes and communicates with the APIE, including third party Apps, whether by program application, program web application, through a website or any network communication system.

Admin: The electronic software that may include the following functions: control, modify, delete, reprocess, process, and communicate, with APIE, as well as other like functions as apparent to one of ordinary skill in the art.

Content: Electronic data aggregated to one or many title(s).

Event: A Geolocation having associated therewith a plurality of Geo Places.

Geolocation: A geographic location or area measured by one of many technologies, such as but not limited to: Global Positioning System (GPS), wireless systems, beacons, location systems, and other like technologies.

Geo Place: Content with a Geolocation as a Rule.

Retrieval: A User Device using Content in any format and in all capacities via an App or a website.

Retrieval Range: The range Rule from a Geo Place or Event in which a User Device may Retrieve Content in respect to the Geolocation of the User Device, such as the physical distance from the location of a Content of which the Content may be Retrieved by a User Device. A Retrieval Range generally does not need to verify if other Rules need to be satisfied.

Retrieval Rules: The set of Rules for Content, which shall be for an Event of Geo Places or a Geo Place, and which, when said Rules for Event, Geo Place and/or Content have been satisfied, Content is Retrieved and/or used by a User Device.

Rules: One or many requirements set on a Geo Place and/or Content, and in which any part or in whole may be satisfied to release Content parts or in whole, for use accordingly.

Unique Identifier (UID): Used by APIE to verify, identify and/or communicate with a user, User Device, App, Content, Geo Place, Geolocation, Event or third party registrations, which can be: unique and random keys, registration codes, encryptions, or other like security measures.

User Device: A mobile device using electronic communication and processing, which can have one or more Apps and/or access one or more websites and can communicate and process with APIE.

DETAILED DESCRIPTION

FIG. 1 is a block diagram illustrating an embodiment of a User Device 100, which could be a mobile phone, tablet, or other computing device. The User Device 100 may be utilized to generate, Place, and Retrieve Content at a Geo Place in conjunction with the APIE 218. The User Device 100 can include a user Interface Module 102, a Location Services Module 104, a Storage Device 106, and a Processor 110.

Figure 2:
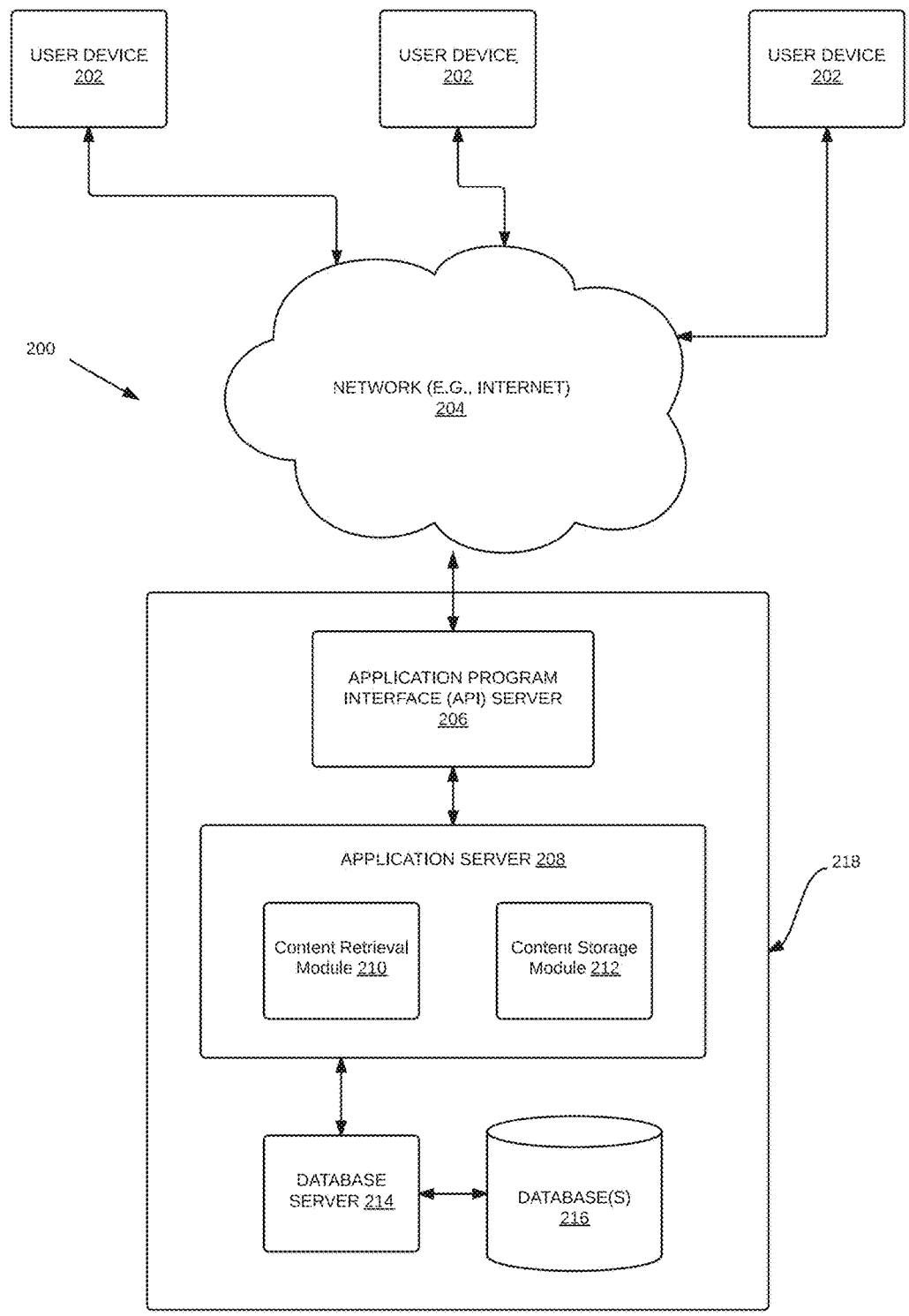
FIG. 2 is a network diagram illustrating one example embodiment of a network system having a client server architecture (i.e. APIE to App or User Device) configured for communicating and exchanging data over a network.

Specifically, the User Device 100 may have a user Interface Module 102 that provides direct access to the APIE 218 (as illustrated in FIG. 2) for Placement and Retrieval of Content. The Location Services Module 104 ascertains the User Device's geographical location, such as, for example, coordinates for associating with Content and for the Retrieval of Content. Multiple sensors and inputs may be utilized to obtain this information such as, for example, GPS, Wi-Fi, sensors, beacons or Bluetooth based sensors.

The Storage Device 106 includes memory that may be used by the Processor 110. The Storage Device 106 stores data utilized by the APIE 218. The Processor 110 is a central processing unit and includes a Content Capture Module 112, a Content Placement Module 114, and a Content Sharing Module 116. The Content Capture Module 112 allows the User Device to capture digital media including but not limited to URL, text, screen captures, pictures, video, and audio. The Content Placement Module 114 allows users to select Geolocations for Content which they may capture using the Content Capture Module 112 or that may already be stored on the Storage Device 106. The Content Sharing Module 116 allows the User Device 100 to share Content Placed at Geolocations with other User Devices 100 and also the use of the APIE 218 under the parameters of said system and Rules if any.

FIG. 2 is a network diagram illustrating a communication system 200 for transmitting data between multiple User Devices 202 and an APIE 218 over a Network 204. This is an example of an embodiment of a communication system in the form of client server architecture. Other example embodiments include network architectures such as distributed network environments and peer-to-peer environments.

The communication system 200 in this example includes an Application Program Interface (API) Server 206 which communicates with an Application Server 208 to Retrieve and store data on a Database 216 through Database Server 214. One such use for a network architecture as described herein is to Place and Retrieve Content or Geo Places and Rules which govern this Retrieval. In such an embodiment, the Content Retrieval Module 210 handles the interface of validating a User Device's 202 geolocation against the Rules of Geo Places. If the User Device 202 satisfies the Rules, then the Geo Place is Retrieved and returned to the User Device 202. In such an embodiment, the Content Storage Module 212 handles the interface of receiving Geo Places and Rules from a User Device 202 and storing the data within a Database 216.

Figure 3:
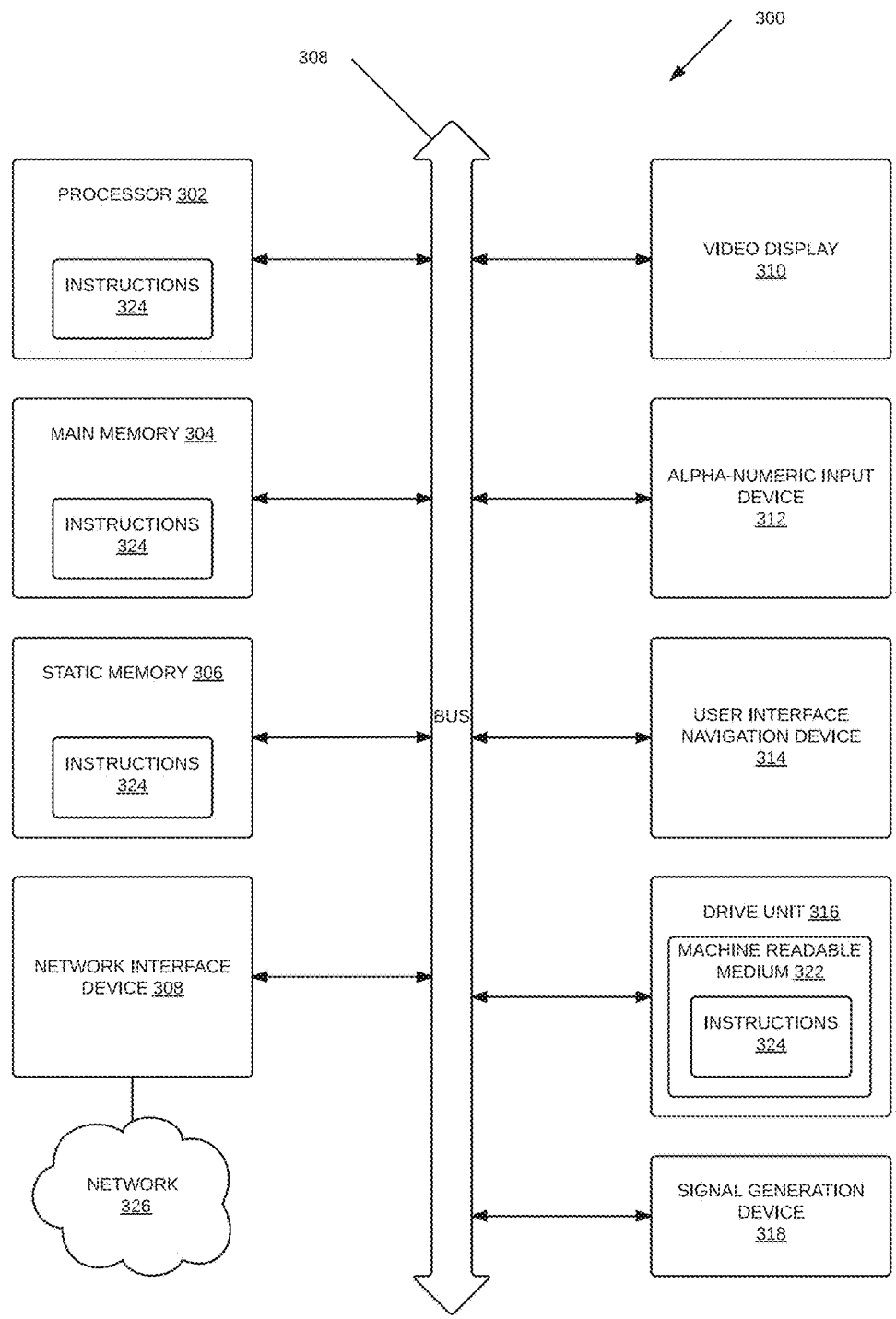
FIG. 3 is a diagrammatic representation of a machine or device in the example form of a computer system within which a set of instructions for causing the machine to perform any one or more of the methodologies discussed herein and which may be executed.

FIG. 3 is a block diagram illustrating an example of a computer system 300 which may be used in some embodiments of the invention. While the computer system 300 illustrates various components of a computer system, it is not intended to represent any particular architecture or manner of executable instructions which cause a processor to perform certain steps. This invention may run on or with computers systems similar to FIG. 3.

Specifically, the computer system 300 may include components typical of computer systems that are known by those of ordinary skill in the art, including a processor 302, main memory 304, static memory 306, a video display 310, an alpha-numeric input device 312, a user interface navigation device 314, a drive unit 316, a signal generation device 318, all of which may be connected to each other through a main bus 308. Instructions 324 may be processed via the processor 302, and stored in one or more of the main memory 304, static memory 306 and/or the machine readable medium 322 on the drive unit 316. The network interface device 308 may be connected to a network 326.

Figure 4:
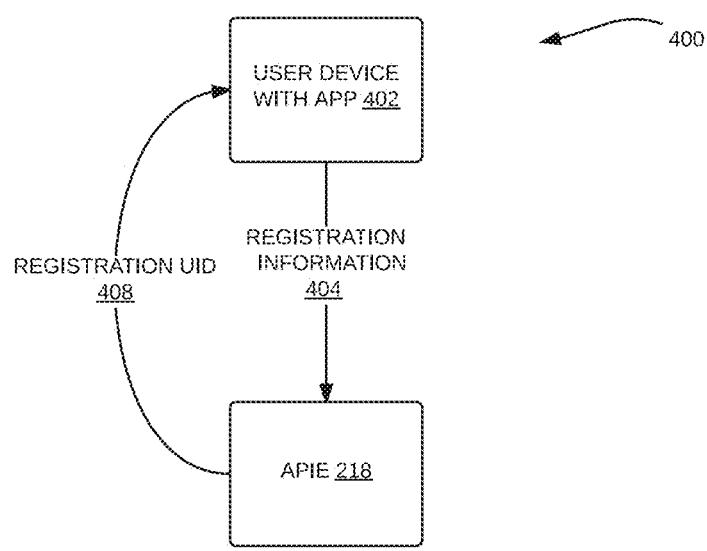
FIG. 4 illustrates a process of registering with the APIE and obtaining credentials and parameters for User Devices and Apps.

FIG. 4 illustrates a general method 400 of the present invention for allowing a User Device 402 access to and registration with the App and APIE 218. Registration is required prior to using the APIE 218 for the purpose of Content Placement and Retrieval. To register, the User Device 402 accesses the App and APIE 218 by sending Registration Information 404 to the APIE 218. Once the requirements of registration are satisfied, the User Device with the App 402 can access the APIE 218 via UID contained within the response message Registration UID 408 to perform additional APIE functions.

Figure 5:
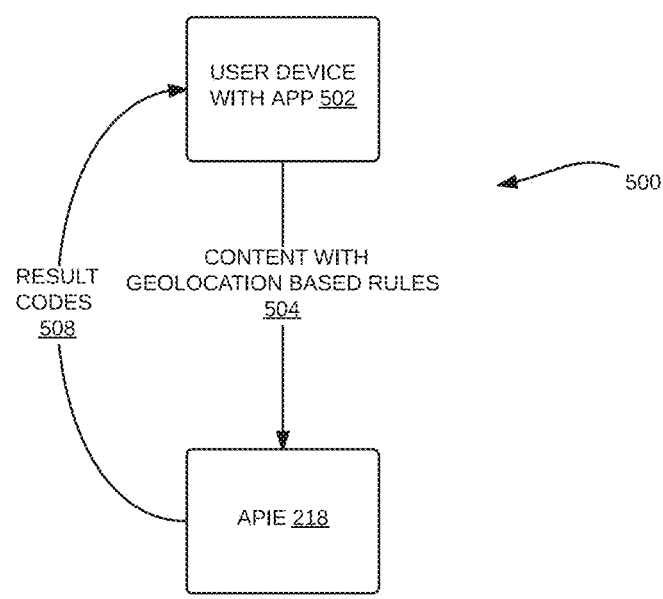
FIG. 5 illustrates a process of placing Content into Geo Place.

FIG. 5. Illustrates a general method 500 of the present invention for allowing a User Device 502 to Place a Content at a Geolocation to create a Geo Place. In this embodiment, the User Device 502 sends the Content with parameters 504 to the APIE 218 for processing. The APIE 218 then returns a series of Result Codes 508 indicating the success or failure of various processing steps.

Each call to the APIE 218 may specify the following parameters, not all which are required:
  Registration UID 408—Obtained by registration via the process described in FIG. 4.
  Geo Place (e.g., A Content paired with a Geolocation).
  Rules—For example here are some of the Rules that may be Placed on Content, each Rule being independent of another, for purposes of Retrieval in full or part:
    Available Date—the available date and time that Content may be first Retrieved by a User Device.
    Expiration Date—the expiration date and time when Content can no longer be Retrieved by a User Device. An expiration date may not be required.
    Privacy—the levels and exceptions for which users, if any, are allowed to Retrieve Content. A Privacy may not be required.
    Sharing—Even though sharing is a feature that may not be a Retrieval Rule, sharing can be made to be a Retrieval Rule. The requirement is for a user to share Content with other users, in order to Retrieve Content. A sharing may not be required.
    Max Retrieval Quantity—this number specifies the number of total Retrievals by unique User Devices and/or users that Retrieve a specific Content. This number representing the number of times Content may be Retrieved may not be required.
    Dynamic Retrieval Threshold—Specifies if the Retrieval threshold can dynamically expand or contract to satisfy Content demands, parameters; or Rules.

As a user Places Content associated with Geolocations, the User may associate further Geo Place conditions and/or meta data as follows. Specifically, further conditions or meta data may include defining an Event (as discussed in more detail below), and/or adding a title and/or a longer description that may provide a contextual overview of the Content Placed. Moreover, the Content may be defined by type or a category that defines the Content, such as being defined as an audio file, a picture file, a video file, a URL with or without page capture, text, or other like types or categories. In addition, the Content may have the ability to be flagged to indicate the identity of the user that Retrieves the Content, or provide a counter showing the number of times the Content has been Retrieved. Other like conditions or meta data may include a text field where information about the Content may be Placed, a file name, such as a field that specifies the location of files that correlate to Content, or a retrieval notification flag that indicates to the user whether the Content is Retrieved. Other like conditions or meta data may be associated with the Content as may be apparent to one of ordinary skill in the art.

According to FIG. 5, the Content Placement call 504 passes all of the provided parameters (i.e., Content with Geolocation based Rules) to the APIE 218 which in turn validates all of the provided parameters. If a required parameter is omitted, or is provided incorrectly, or does not match, the APIE 218 generates one or more codes 508 and returns them to the calling application 502.

If the required parameters are valid, the Placed Content is added to APIE's associated database, as shown in FIG. 2 component 216, and the Content is available for Retrieval.

The Placement of Content and subsequent association of the Content to a Geolocation may create a Geo Place for Retrieval by User Device(s) which may be done in any manner, such as by accessing the APIE 218 via an App, browser or interface from any computing device.

For example, referring again to FIG. 2, a system 200 of the present invention allows one or more users and User Devices 202 to interact with the APIE 218 for Placement of Content to form Geo Places. Specifically, as Content is generated by Admin and User Devices 202, the APIE 218 may allow the user to access the APIE 218 as shown in FIG. 2, wherein the Content and associated Geo Places and associated Rules may be stored utilizing the Content Storage Module 212 on the Application Server 208. A UID that provides access to the Content may be generated by the APIE and may be passed to a User Device for further use thereof by the user, as described in more detail below.

Figure 6:
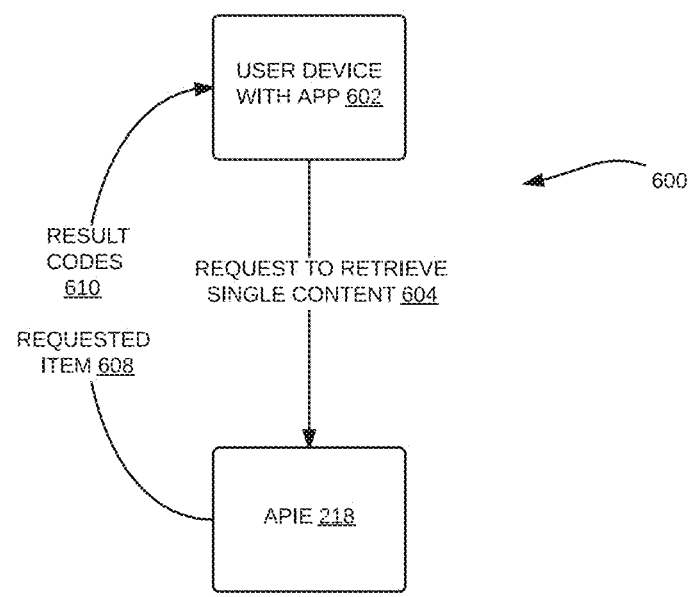
FIG. 6 illustrates a process of Retrieving Content.

Referring now to the invention in more detail, FIG. 6 illustrates a method 600 for allowing a User Device to Retrieve an individual Content defined as a Geo Place. Specifically, a User Device 602 has sent a "Retrieve Individual Content" call 604 to the APIE 218 into one or more of the user's own applications (i.e., third party applications). The APIE 218 then processes the request and returns Result Codes 610 indicating the result of the call.

Each call to the APIE 218 may specify the following parameters, not all which are required:
  Registration UID 408—Obtained by registration via the process described in FIG. 4.
  Content UID—The UID of the Content to Request.
  User Device geolocation.

After receiving the Retrieve Individual Content call 604, the APIE 218 validates the provided parameters. If a required parameter is omitted, or is provided in incorrect format, or does not match (i.e., the provided Registration UID 408 must be matched in the APIE), the APIE 218 generates one or more codes and returns them to the calling application in the form of Result Codes 610.

If the required parameters are valid and the APIE UID matches, the APIE 218 attempts to return the requested Content or Geo Place via the Return Requested Content step 608 (including, for example, the title, description, and the actual Content—the text field or the physical file).

Specifically, when the User Device running the App 602 within the appropriate Retrieval Range or has crossed the Retrieval Range for Content (as described below), and all the needed Rules are satisfied, APIE 218 returns the Content via step 608 (the title, description and text field/file) via the Return Result Code(s) step 610, which will provide a URL associated with the Content for Retrieval. If the user who Placed the Content required a Retrieval notification, the APIE 218 sends a notification to the User Device of the user who Placed the Content. In processing the call, the APIE 218 increments tracking fields and other analytics metrics. In one embodiment, the number of Retrievals is incremented.

When the User Device running the App is not within the appropriate Geolocation to Retrieve the Geo Place or Geo Places with Retrieval Range for the Content, the APIE 218 returns a code stating that the device is out of range for that Content.

Figure 7:
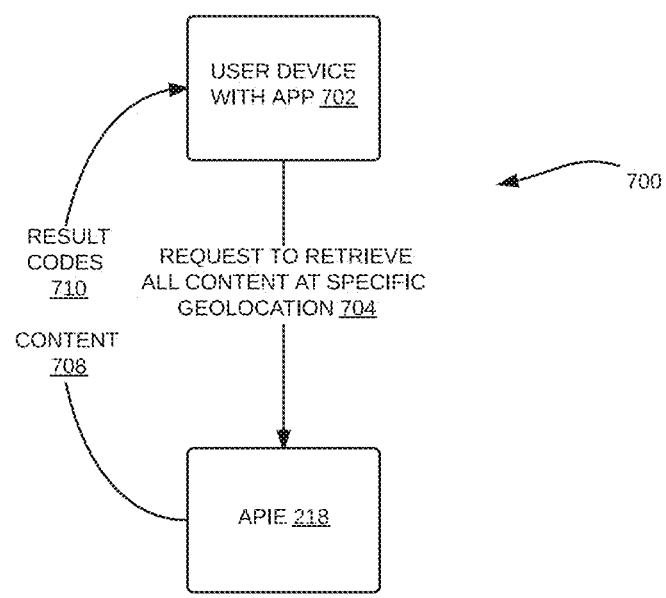
FIG. 7 illustrates a process of Retrieving all Content and information based on the User Device's satisfaction of Geolocations and Rules.

Referring now to the invention in more detail, FIG. 7 illustrates Content Retrieval Method 700 to a User Device with App 702. Specifically, the User Device 702, through the App, has a call to the APIE 218.

Thus, FIG. 7 illustrates a method 700 for allowing a User Device 702 to Retrieve all Contents which the User Device satisfies each of Content's Rules in part or whole including, for example, the User Device's Geolocation. Specifically, a User Device 702 calls the APIE 218 with a specific request for all Contents at a specific Geolocation via step 704. The APIE 218 then processes the request and returns Result Codes 710 indicating the result of the call. The parameters applicable to FIG. 6 may apply here as well.

After receiving the request 704, the APIE 218 validates the provided parameters. If a required parameter is omitted, or is provided in incorrect format, or does not match (i.e., the provided Registration UID must be matched in the APIE), the APIE 218 generates one or more codes and returns them to the calling application in the form of Result Codes 710.

If the required parameters are valid and the UID matches, the APIE 218 finds all Geo Places which the parameters satisfy the Rules for Geo Place and returns the Content to the User Device in the form of Contents 708 (including, for example, the titles, descriptions, and the Contents—the text field or the files).

Figure 8:
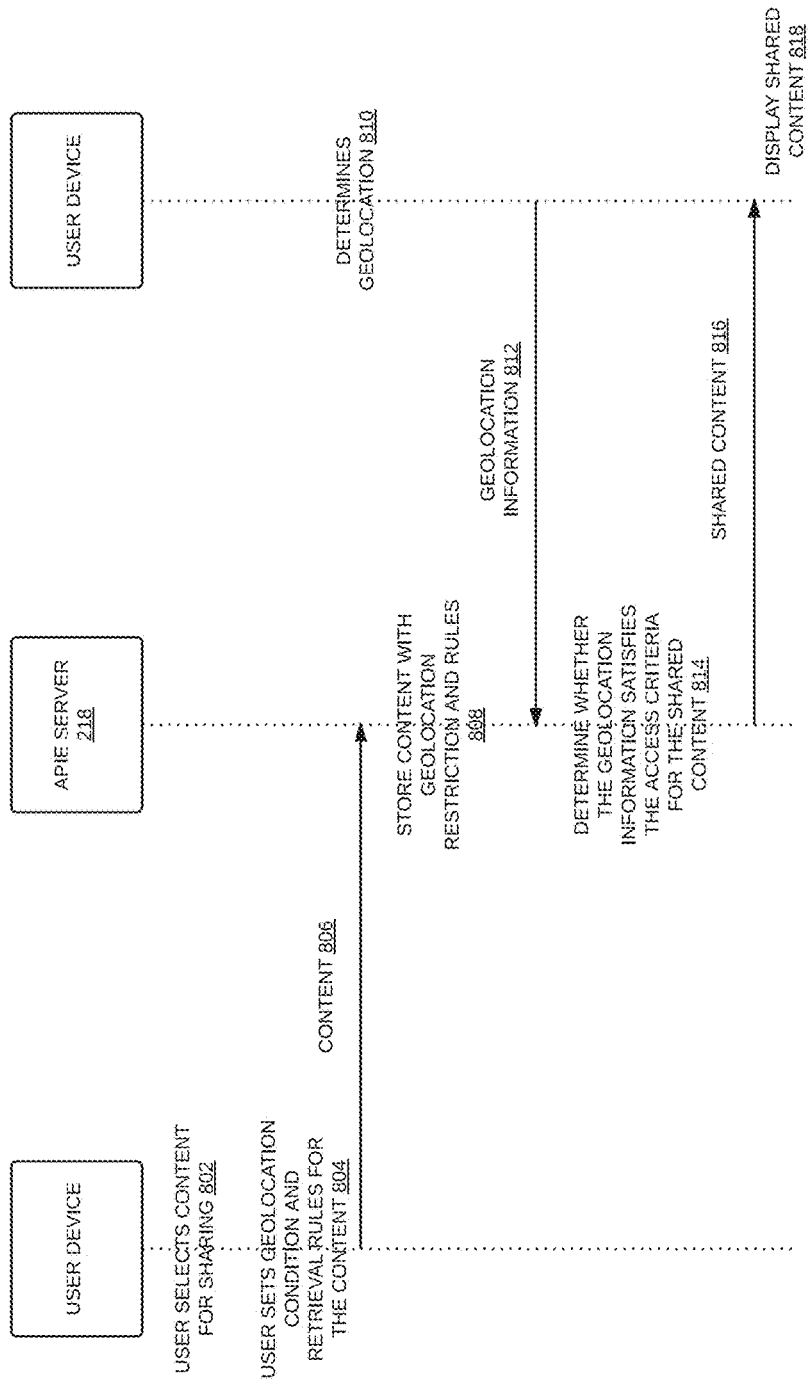
FIG. 8 illustrates a process of placing, Retrieving and feature activity for Content and/or information based on the App via User Device, Geo Place and Rules satisfied.

In an alternate representation of the present invention, FIG. 8 illustrates a method 800 illustrating Content Placement and Content Retrieval, in an embodiment of the present invention. Specifically, the App, via the User Device may generate Content, as described above. The Content may be selected by the App for sharing, notifying, inviting and/or communicating with others via the APIE 218 via step 802. The Geo Place may also be selected by the User Device via step 804, as well as any number of other Rules and parameters specified above with reference to FIG. 5. The Content 806 may then be shared via the APIE 218, where the Content 806 and associated Geo Place and Rules information, as well as other parameters, may be stored via step 808.

At another point according to the method described in FIG. 8, other User Devices may determine their Geolocation via step 810 using Location Services Module 104 (as illustrated in FIG. 1) and submit the device's Geolocation to the APIE Server 218 as Geolocation Information 812. The APIE Server 218 then processes this request and determines if the Geolocation Information 812 satisfies the access criteria for the shared Content 814. If so, the APIE Server 218 returns the shared Content 816 to the User Device to be displayed to the user via step 818.

Figure 9:
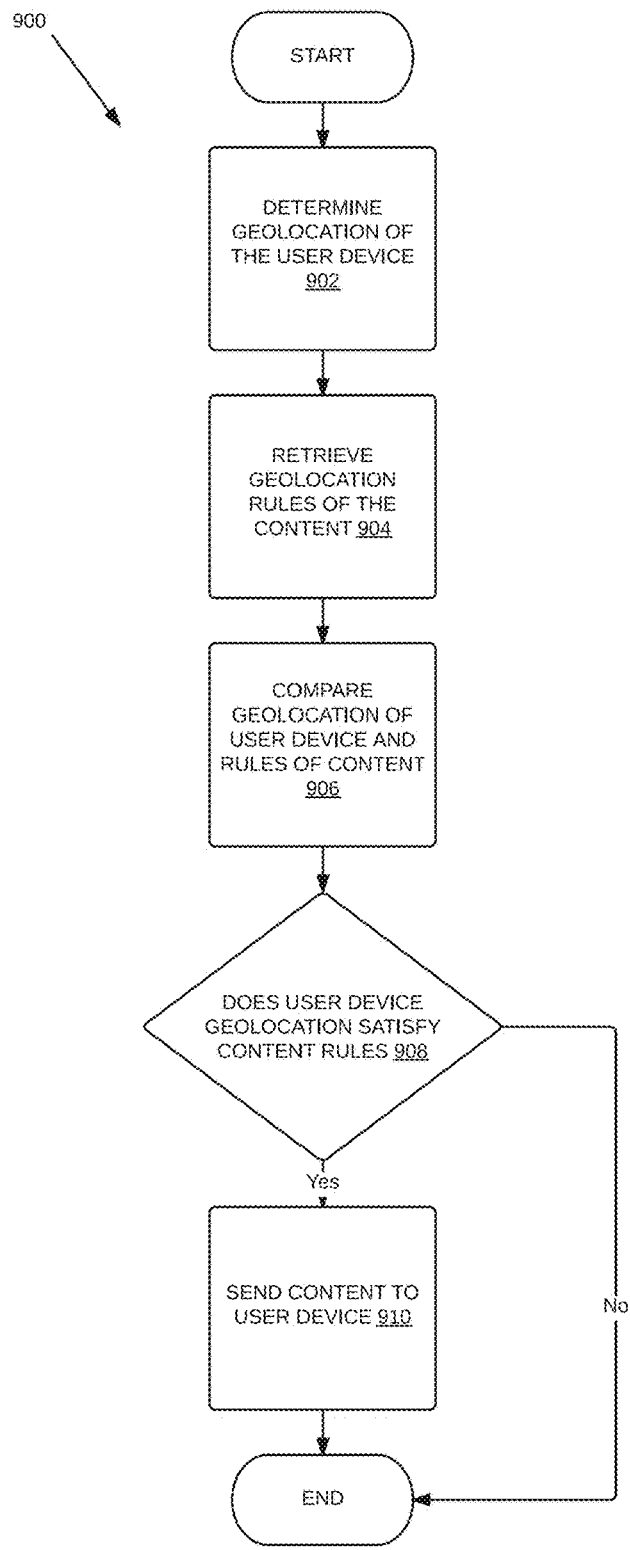
FIG. 9 is a flow diagram illustrating one example method for Retrieving a Content from a Geo Place.

Referring now to the invention in more detail, FIG. 9 illustrates, in an embodiment of the present invention, a method 900 for providing User Device access to the Content that has been Placed in a Geo Place. In a first step, the Geolocation of the User Device is performed via step 902 followed by Retrieval of the Geolocation Rules of the Content via step 904. The Geolocation of the User Device is compared to the Geolocation Rules of the Content via step 906. If the User Device Geolocation satisfies the Content Rules (as determined in step 908), the Content is sent to the User Device 910. If not, then the method 900 ends without Retrieval of the Content by the User Device.

In an embodiment, the Content may have an associated Retrieval Range. If the User Device running the App is within the Retrieval Range for Content, and other Content Rules are satisfied (such as, for example, the number of Retrieval times is less than any limit set by the user (in this case Content provider), and the date for the attempted Retrieval is after the provided available date and before the provided expiration date), the APIE Server 218 returns the Content in the App. If the user who Placed the Content required a Retrieval notification, the APIE 218 sends a call to App. The APIE 218 increments tracking fields for the number of Retrievals as well as the number of times the APIE 218 was called for the specific Content.

When the user Device is running the App within the appropriate Retrieval Range for the Content or when User Device has crossed a Retrieval Range, but does not satisfy other Rules (Rules are created by Admin and App and are short listed above), the APIE 218 shall not allow Retrieval of Content.

When the user Device running the App is not within the Retrieval Range for the Content or has not crossed the Retrieval Range for the Content, the APIE 218 will send a call for not satisfying the Geo Place Rules.

In an embodiment, Content associated with a particular Geo Place and/or Event may have at least one Rule for retrieving the content, such as, for example, whether the user Device is at the Geo Place and/or Event, or within the Retrieval Range set. As noted above, other Rules for retrieving the content may be associated with the content, such as whether the threshold number of retrievals has been reached, whether the retrieval is within the date range set, and other Rules associated with the content, as described herein. More than one Content may be associated with a Geo Place and/or an Event, and each Content may have different Rules for retrieving associated therewith. Thus, a first Content may have only one Rule for retrieving—whether the user Device is at the Geo Place or Event, or within the Retrieval Range of the Geo Place or Event. A second Content may have two or more Rules for retrieving the content and thus may be "hidden" from users unless the other Rules for retrieving are satisfied. Therefore, different users may obtain different content based at a Geo Place and/or Event based on whether the user satisfies the various defined Rules for retrieving the various Content.

Figure 10:
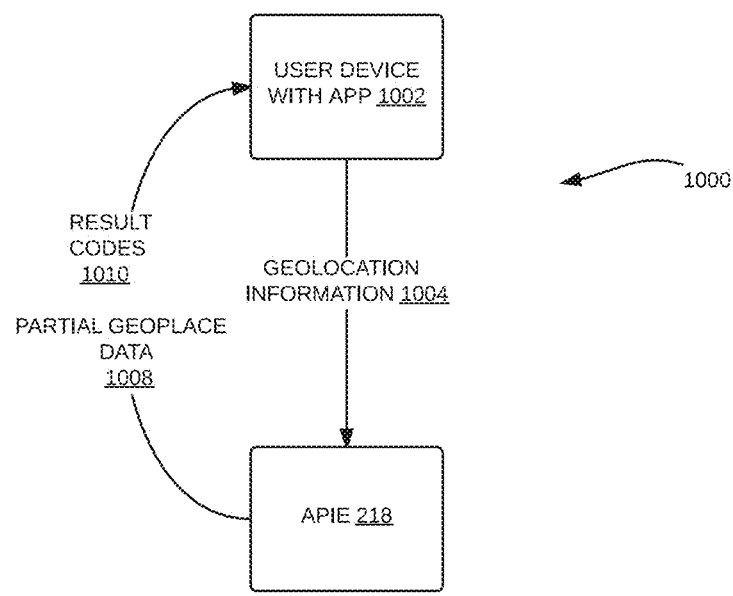
FIG. 10 is a flow diagram illustrating one example method for determining APIE parameters for Content Rules from a Geo Place, in part.

FIG. 10 illustrates a flow diagram of one example method 1000 for Retrieving partial Content information based on a User Device 1002 satisfying some but not all of a particular Content's Rules. In this example, a User Device 1002 makes a Retrieve Content call to the APIE 218 similar to FIG. 7, sending the User Device's Geolocation Information 1004. The APIE 218 processes the call and finds a particular Content's Rules are satisfied partially by the Geolocation Information 1004. The APIE 218 then returns the Partial Geo Place Data 1008 in accordance to the Retrieval Rules. In this embodiment, the Content item has various Rules for each element of data. For example, the Content may have a Retrieval Range that is different and/or independent of the Retrieval Range for Content's metadata (e.g. title, description, comments, etc.); which may be set by user, APIE and/or Admin. If a User Device does not satisfy all Retrieval Rules for Content, it can still satisfy some of the Retrieval Rules for Content.

As a result of this, a User Device may receive more information and/or metadata on a Geo Place based on how close the User Device is to the Geo Place. This will allow a user to get information and/or metadata for nearby Content that the User Device has not satisfied the Retrieval Range for, and can get more as the User Device gets closer.

Figure 11:
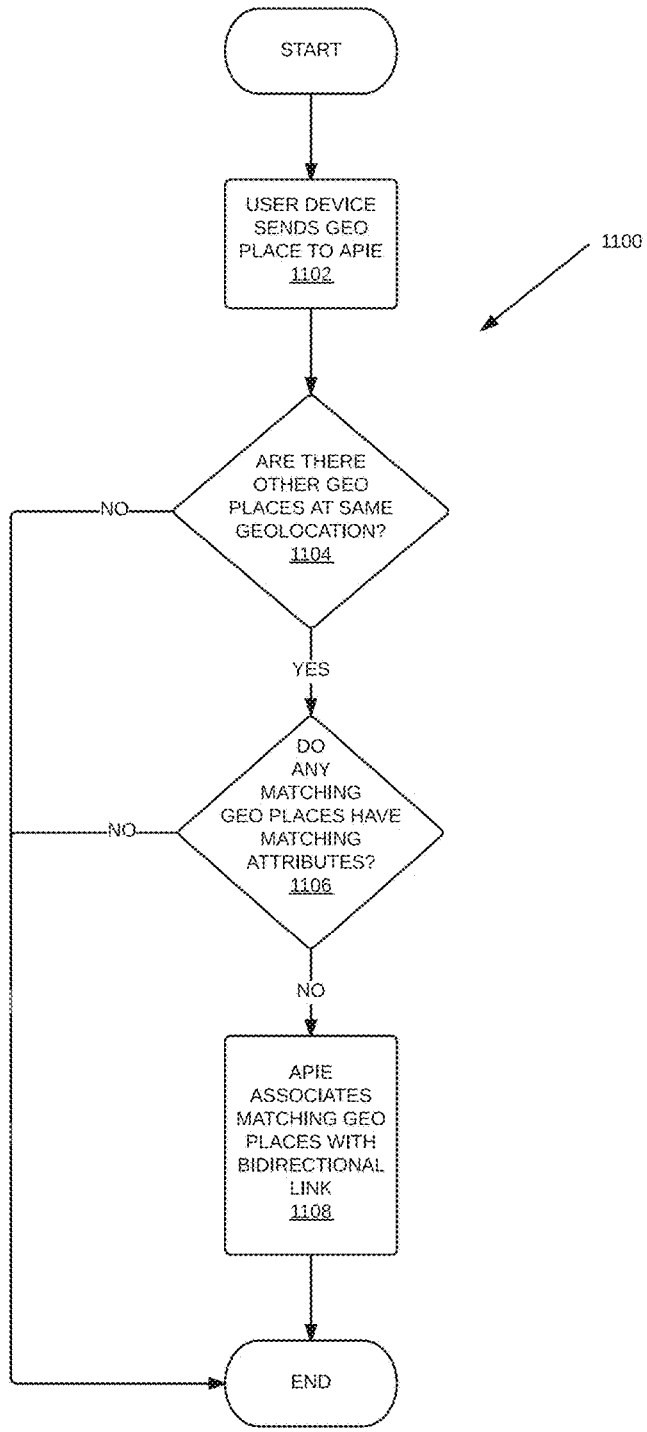
FIG. 11 is a flow diagram illustrating a process of associating Geo Places based on Rules and meta data.

FIG. 11 represents a process for associating Geo Places based on Rules and metadata 1100. At step 1102, a User Device 100 (as illustrated in FIG. 1) places a Geo Place in the form described in FIG. 5. Once the APIE 218 has received the request, the APIE processes the request and determines if there are any other Geo Places which based on Rules and metadata satisfy the conditions of association. The first step of association is determining if any other Geo Places exist at the same Geolocation, as illustrated in step 1104. This matching process takes into consideration Rules including, but not limited to, Retrieval Range. If an overlap exists between the Placed Geo Place in step 1102 and other Geo Places already stored, the APIE 218 determines if any of the attributes (e.g. metadata) match as illustrated by step 1106. For example, if the two Geo Places shared the same title, or were categorized as the same category of Content, the APIE 218 would then consider them a match and establish a bidirectional link between the Geo Places in the database as illustrated by step 1108. In one example of this functionality, Content can be associated to an Event and individual Geo Places. For example, consider if a user at a karate competition places a video of the competition as a Geo Place. If the Event itself (i.e., the karate competition) is in the APIE 218, a video of the competition would be associated to the Event representing the competition. As other users add more Content at the Event, the APIE associates all of them together and with the Event itself. In this way, Geo Places are naturally linked to related Geo Places and/or Events.

Figure 12:
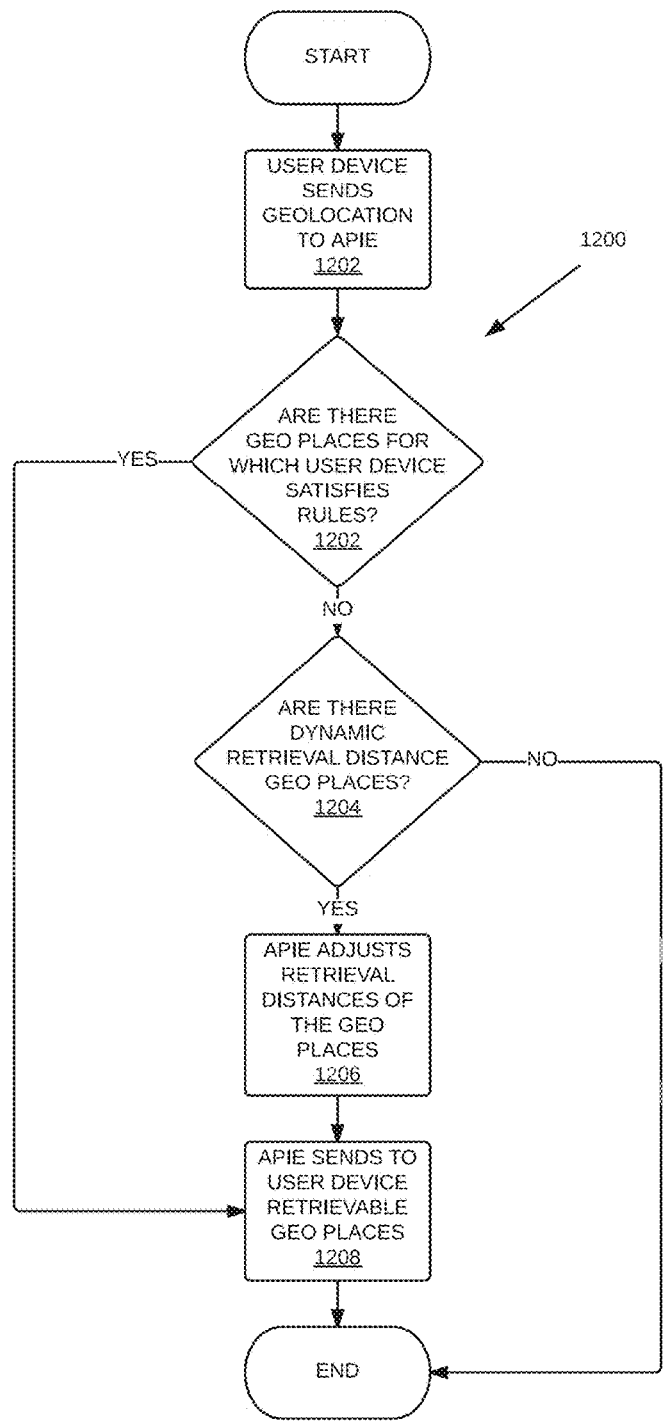
FIG. 12 is a flow diagram illustrating a process of dynamically updating Retrieval Rules based on App and User Device's environmental factors.

FIG. 12 represents a process of dynamically updating Retrieval Rules based on App and User Device's environmental factors. At step 1202, a User Device 100 (as illustrated in FIG. 1) sends its Geolocation to the APIE 218. This request is represented in FIG. 7 by step 704. Once the APIE 218 receives the request, the APIE searches for Geo Places with its Retrieval Rules which are satisfied by the User Device. If there are Geo Places for which the User Device's satisfies the Retrieval Rules, the APIE simply returns the matching Geo Places' Content.

If there are no matching Geo Places, the APIE performs a second search for Geo Places which support dynamic Retrieval Ranges, as illustrated by step 1204. Dynamic Retrieval Range allows the APIE to expand the predefined Retrieval Ranges for Geo Places in the circumstance that no other Content is near the User Device. This is particularly useful in large open environments, such as mountains, forests, and deserts. If no Geo Places satisfy this criterion, the process is over. If there are Geo Places with dynamic Retrieval Ranges, the APIE will adjust the Retrieval Range to encompass the User Device's position, thus satisfying the Retrieval Threshold of a Geo Place, as illustrated in step 1206. The APIE then sends the Content to the User Device as illustrated in step 1208. The dynamic Retrieval Range allowances may be set by user, APIE and/or Admin.

Figure 13:
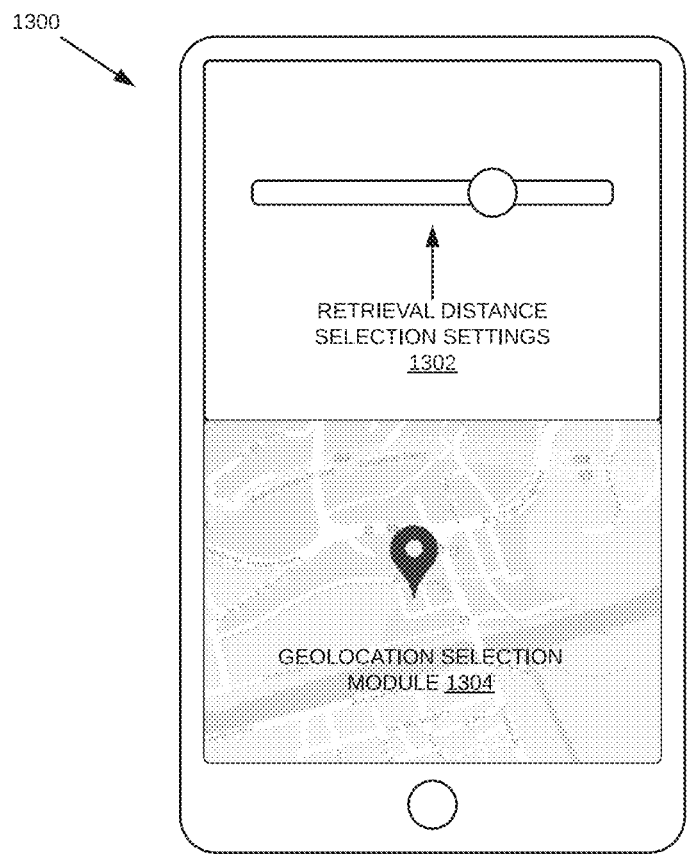
FIG. 13 is an example GUI of an App or API on a User Device for modifying the Retrieval distance of a Content.

FIG. 13 is an example of a graphical user interface (GUI) of an App's or API's interface on a User Device for modifying the Retrieval Range of a Content 1300. In this example embodiment, a User Device allows a user to select the Retrieval Range of a particular Geo Place by utilizing a slider 1302. In this way, different Geo Places can have various Retrieval Ranges. One example of this functionality is to allow Content to have larger and smaller audiences. For example, a restaurant off the beaten path may want a relatively large Retrieval Range for their Content, to allow people far away to discover their Content. In another example, a scavenger hunt organizer may want a very small Retrieval Range for their Content, to make it more difficult for scavenger hunt participants to discover the Content.

Figure 14:
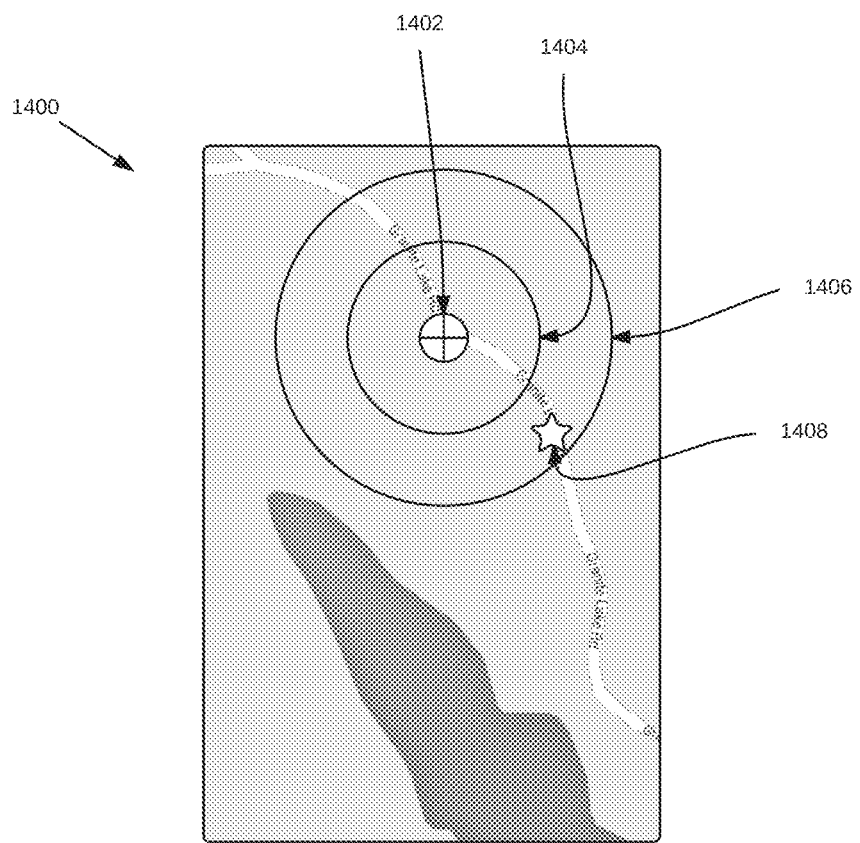
FIG. 14 is an example GUI of an App or API on a User Device showing dynamic Retrieval Rules based on App and User Device's environmental factors.

Referring now to FIG. 14, which is an illustration 1400 to visually present how more Retrievable Content may be available if no Content or not enough Content is available to a User Device 1408 when such User Device 1408 may be out of the Retrieval Range 1404. This illustration is an example of the process in FIG. 12 of dynamic Retrieval Ranges. This will allow the user to see more Content 1402 around them based on what is currently nearby to the User Device 1408. For the example, User Device 1408 will be able to use the Content 1402 even though User Device is outside Retrieval Range 1404 in this instance. Specifically, the User Device 1408 may be outside the normal Retrieval Range 1404 of the Content 1402. By following the method of FIG. 12, the APIE analyzes whether there are Geo Places nearby that have dynamic Retrieval Ranges (step 1204). If so, the APIE adjusts the Retrieval Range 1406 of the Content 1402 via step 1206 and then sends to the User Device, via step 1208, the now-discoverable and Retrievable Content 1402.

Figure 15:
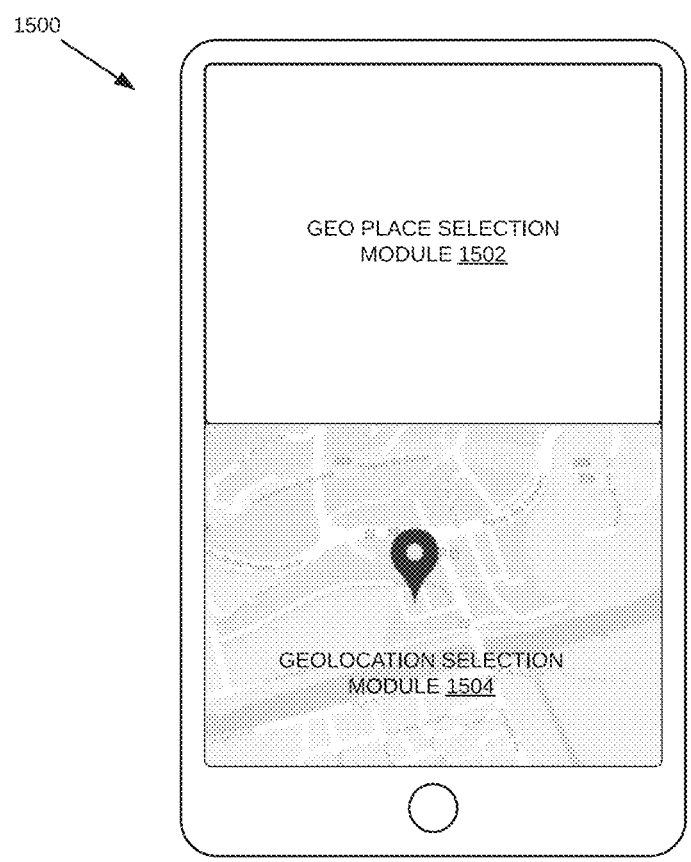
FIG. 15 is an example GUI of an App or API on a User Device being viewed by a user, to select a Geolocation.

Referring to FIG. 15, for when a user Places Content using the App module 1500, the Geolocation Selection Module 1504 shall gather the Geolocation from User Device to create a Geo Place via Geo Place Selection Module 1502. The selection of the Geolocation can be automatic based on the User Device's Geolocation information or the user can move the Placement of the Content to a different area via Geolocation Selection Module 1504 to create a Geo Place. When a user chooses to Place the Content in a different area, the user shall have a placement range that is acceptable to Place within, and this range is processed by the App module 1500 and Geolocation, due to the parameters set by the APIE 218 and/or Admin and communicated to App.

Figure 16:
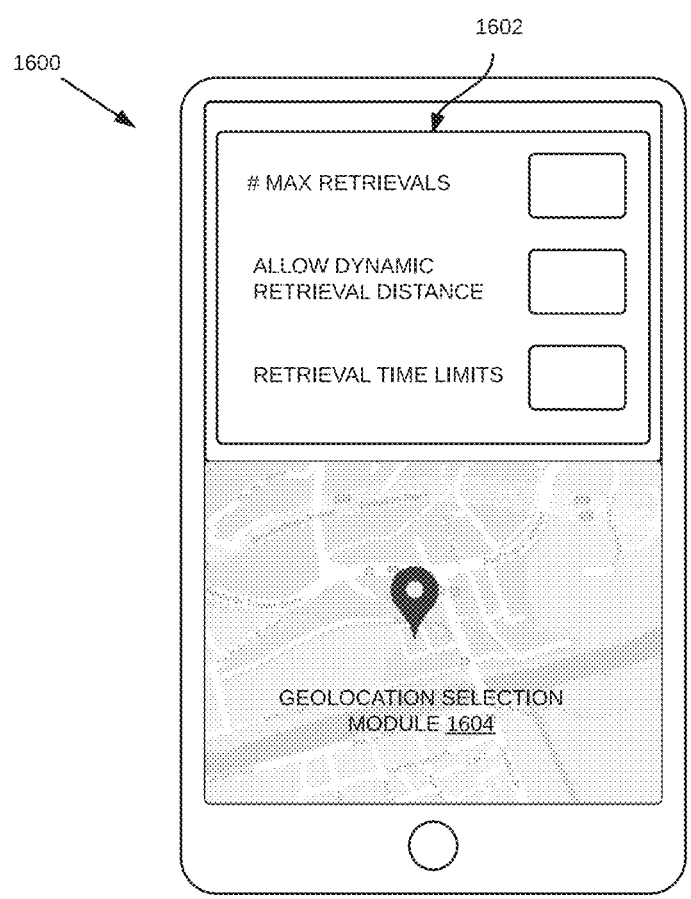
FIG. 16 is an example GUI of an App or API on a User Device for setting the Retrieval Rules of Content.

FIG. 16 is an example of a screen for App module 1600 for a user to input Rules 1602 for Content at a Geo Place to make Retrieval Rules. In this example user would select the maximum number of Retrievals, Retrieval distance from Geo Place (aka Retrieval Range) and/or whether dynamic Retrieval Range is desired, and Retrieval time limits. Retrieval time limits may typically have a start date and time and may have an expiration date and time. This example is a short list of potential Rules a user providing Content may apply to a Geo Place, and it should be noted that other Rules may be provided to a user for providing Retrievable Content to a Geo Place.

Figure 17:
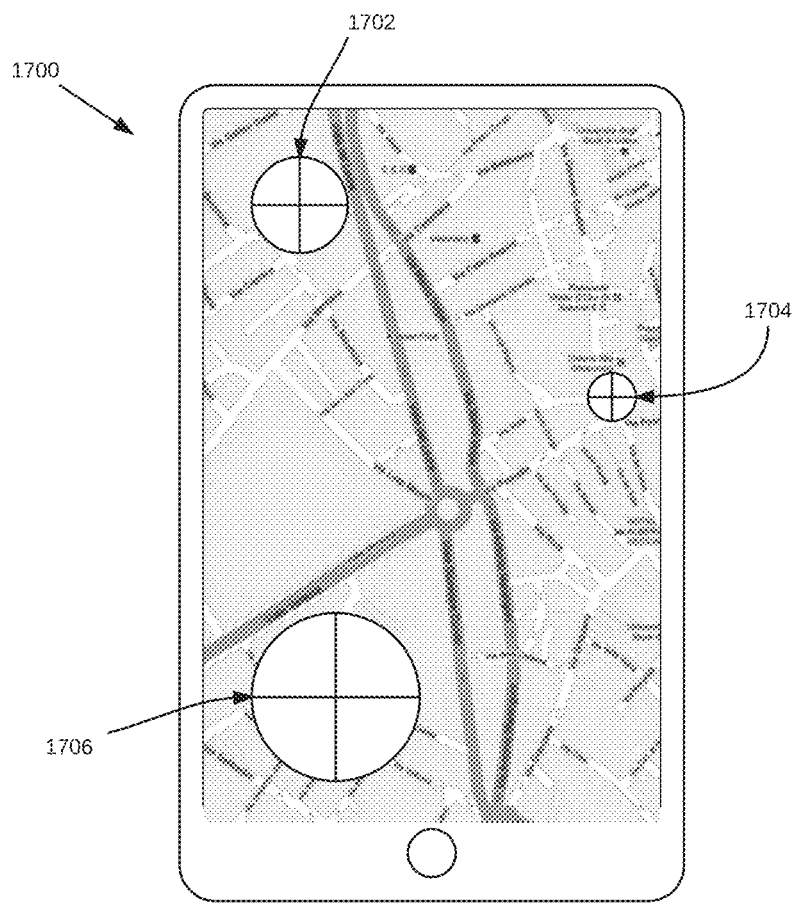
FIG. 17 is an example GUI of an App or API on a User Device for viewing Content in a map view with their respectful Geo Places and Retrieval Ranges.

FIG. 17 illustrates an example GUI of an App or API on a User Device for viewing Content in a map view with a plurality of Geo Places and their associated Retrieval Ranges 1700. In this example embodiment, a User Device shows a map with Geo Places overlaid and Placed at their respectful Geolocations. The size of the circle indicates the range size of the Retrieval Range and shows what area a User Device must be in to satisfy the Geo Place's Rule for Retrieval Range. Item 1704 is a Geo Place with a relatively small Retrieval Range. Item 1702 is a Geo Place with a relatively medium Retrieval Range. Item 1706 is a Geo Place with a relatively large Retrieval Range.

As noted above, the Retrieval Range for a Geo Place and/or Event may be a circle surrounding the particular Geo Place and/or Event, with the Geo Place and/or Event at the center of the circle. Moreover, the user may be provided with the ability to adjust the size of the Retrieval Range by, for example, adjusting the radius of the Retrieval Range, thereby making the circle bigger or smaller, as desired by the user. The Retrieval Range, however, may be other shapes and the invention should not be limited as defined herein. For example, the Retrieval Range may be in the form of a custom shape. For example, a user may be presented with the option to place "posts" around a Geo Place and/or Event, and the system defined herein may connect the posts together, either as straight lines, curved lines, or combination of straight lines and curved lines, to define a custom Retrieval Range having a shape different from circular.

The controls to adjust the size and/or shape of the Retrieval Range for a Geo Place and/or Event may be presented to a user in any manner, such as using "+" or "−" symbols on a screen, or placing the user's finger on a graphical representation of the Retrieval Range and manually moving the boundaries thereof outwardly, inwardly, and/or to form any shape.

For example, the user may wish to design a Retrieval Range for a Geo Place and/or Event that traces the contours of a map, such as hills, mountains, rivers, lakes, buildings, towns, cities and other like topographical features. Thus, the user may define a Retrieval Range that matches the contours of the area surrounding the Geo Place and/or Event. Alternatively, the system described herein may have stored a map having topographical contours defined thereon, such as natural landscape topography, buildings, streets, or other like topographical contours. A user may select to generate an automatic Retrieval Range based on the contours of the stored map. Specifically, a user would merely need to provide a Geo Place and/or Event location, either using the geo location of a mobile phone or other like device, or to specify an address or GPS coordinates for where the desired Geo Place and/or Event is located. The system of the present invention may then automatically place a custom Retrieval Range around the Geo Place and/or Event based on the contours of the stored map.

Figure 18:
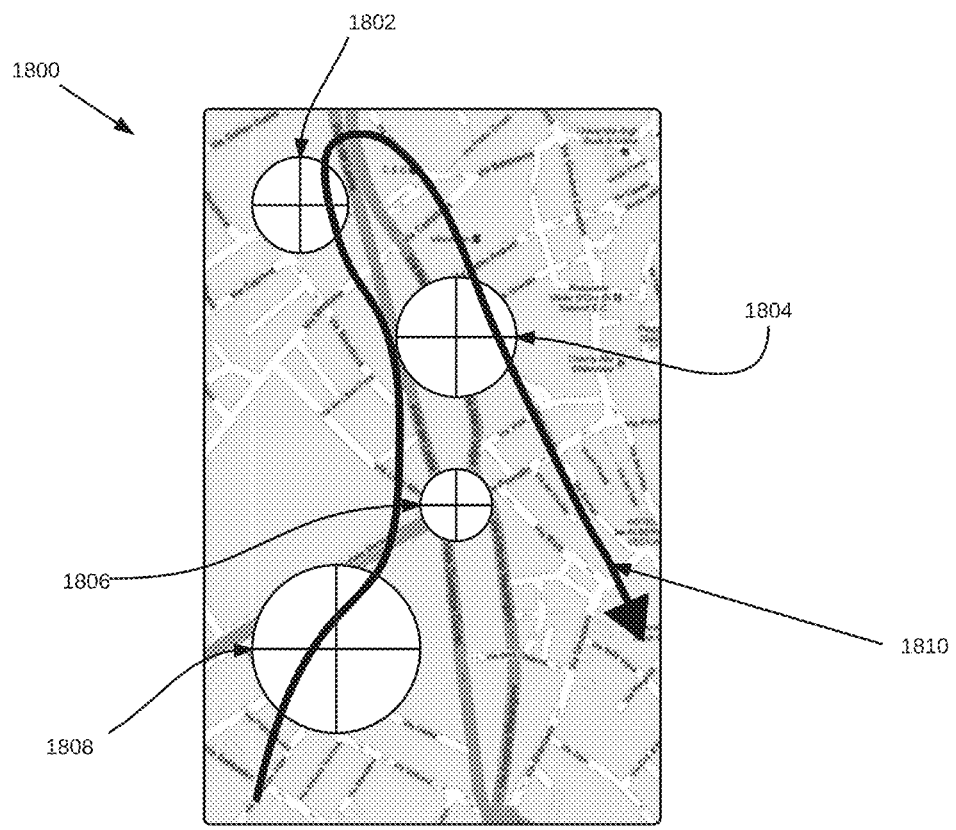
FIG. 18 is an example of visualization of a user's path for Content Retrieved by User Devices.

Referring to FIG. 18, which is an illustration 1800 to visually present a user's path 1810, and what Content may be available to user's User Library on the user's User Device. For an example 1808 represents a Geo Place, Retrieval Range and Retrieval Rules for Content; in this example the User Device must cross through the Retrieval Range (and otherwise satisfy the Retrieval Rules) of this Geo Place and use the Content within this Retrieval Range for user to have rights to it in the User Device's User Library. Also for an example 1802 may represent a second Geo Place, Retrieval Range and Retrieval Rules for Content; in this example the User Device must cross through the Retrieval Range (and otherwise satisfy the Retrieval Rules) of this Geo Place and use the Content within this Retrieval Range, for user to have rights to it in the User Library of the User Device. Also for an example 1804 may represent a third Geo Place, Retrieval Range and Retrieval Rules for Content; in this example the User Device must cross through the Retrieval Range (and other satisfy the Retrieval Rules) of this Geo Place to access the Content, but may be granted access to use the Content outside this Retrieval Range, for user to have rights to it in the User Library of the User Device. In this set of examples, if user did not use the User Device and App to access the Content in the Retrieval Ranges of 1802, 1804 and 1808, then user could only have Content 1804 if user has satisfied all other Rules for Content 1804 for use by user's User Library. With this path 1810 of user, the User Device may receive notification of Content missed for 1802, 1806 and 1808. The notification may notify user based on what Content was missed and how the user missed the Content and providing usage hints so that user may Retrieve and utilize use more Content. In this same set of examples of user path 1810 the user may further receive notifications of the missed nearby Content. For example, Content 1806 may have an associated Retrieval Range, which was missed by the User Device as the user followed path 1810. However, because the Content was relatively close, the User Device may still receive notifications of missed nearby Content 1806, even though the User Device did not cross through the Retrieval Range of Content 1806. Notifications can be further shown in FIG. 19.

Figure 19:
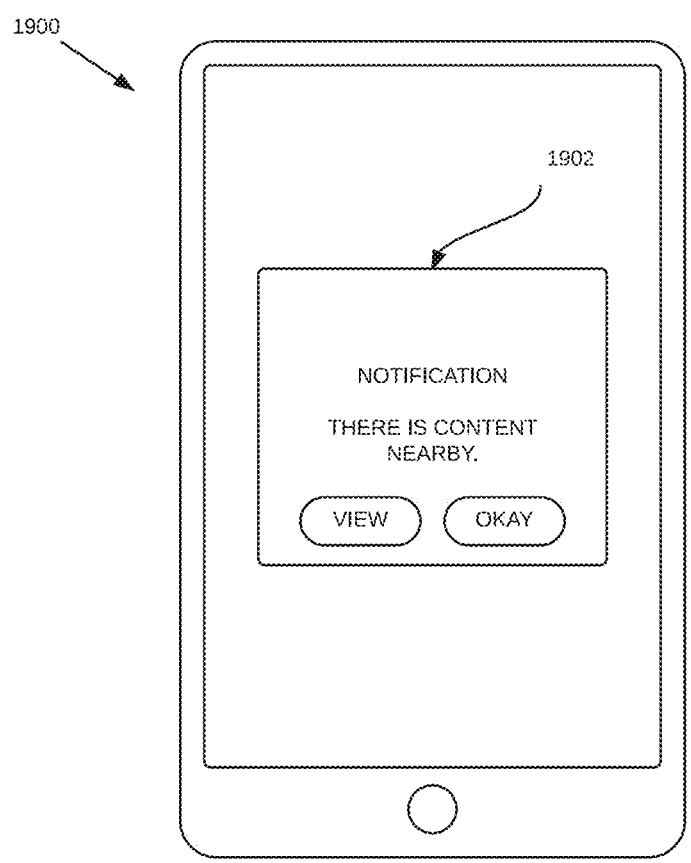
FIG. 19 is an example GUI of an App or API on a User Device for notifications to users via Apps and User Devices.

FIG. 19 is an example GUI of an App or API on a User Device for notifications to users via Apps and User Devices 1900. In this example, a User Device 100 receives a notification 1902 from the APIE 218 informing the user there is Content nearby their Geolocation. Notifications are not limited to nearby Content. For Example, notifications can also inform users of activity related to their own Content such as Retrievals, comments, and other actions by other Users, APIE or Admin.

Figure 20:
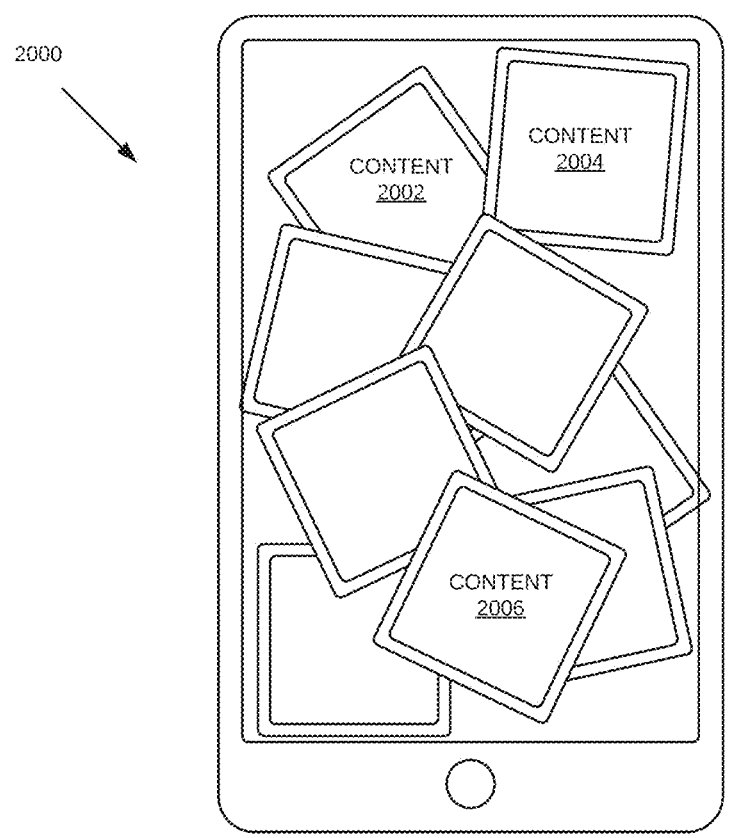
FIG. 20 is an example GUI of an App or API on a User Device for finding, viewing, reviewing and sifting through Content.

FIG. 20 illustrates an example GUI on a User Device for finding, viewing, reviewing and sifting through Content, such as Content accessible in the user's User Library. In this example GUI, a User can move and sift through the Content, much like they could if the Content were physically in front of them and they were sorting through a pile by use of their hands. In this example, Content 2002 may be near the bottom of the pile and is obscured from view by other Content, such as Content 2004. A user can select it to bring it to the top, or select it and push it off the edges of the screen to dismiss the item, or sifting through top Content to get to Content 2002; or other actions such as store for later, favorite, or share. Content 2004 is likewise near the bottom of the pile, but is on top of 2002. Content 2006 is at the top of the pile, and its view is not obscured by any other Content and thereby the user may have quicker access for use of Content.

Figure 21:
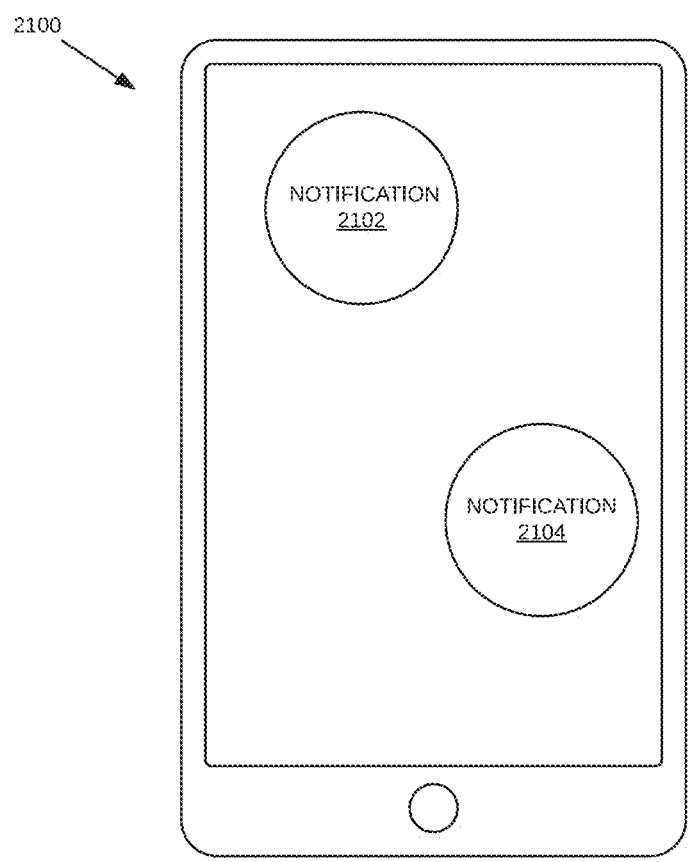
FIG. 21 is an example GUI of an App or API on a User Device for following, viewing, reviewing and selecting Content based on movement and notification via Geolocation and Geo Places.

FIG. 21 is an example of a screen for App module 2100 which the App may display images for Content 2102 and/or Content 2104 that may be nearby User Device. For example notification 2102 User Device may be within Retrieval Range and notification 2104 may be for Content nearby. In this example if user satisfies all Retrieval Rules needed for Content that notification 2102 dynamically notified user for, then user may Retrieve and use the Content notified. In this same example User Device must move to Retrieval Range for Content that user was notified by notification 2104 to be able to satisfy Retrieval Rules for such Content. This example of a screen and the mentioned examples are presented to explain a method for App to notify users of Retrieval Ranges and Content that User Devices are within or nearby, so that user can easily and actively use Content without extra actions, as applicable.

This FIG. 21 is also to demonstrate a method to randomly and/or dynamically notify users based on Geolocation, user's activities, users' activities, nearby activities, Admin and/or APIE to enhance and/or gamify user's experience.

Figure 22:
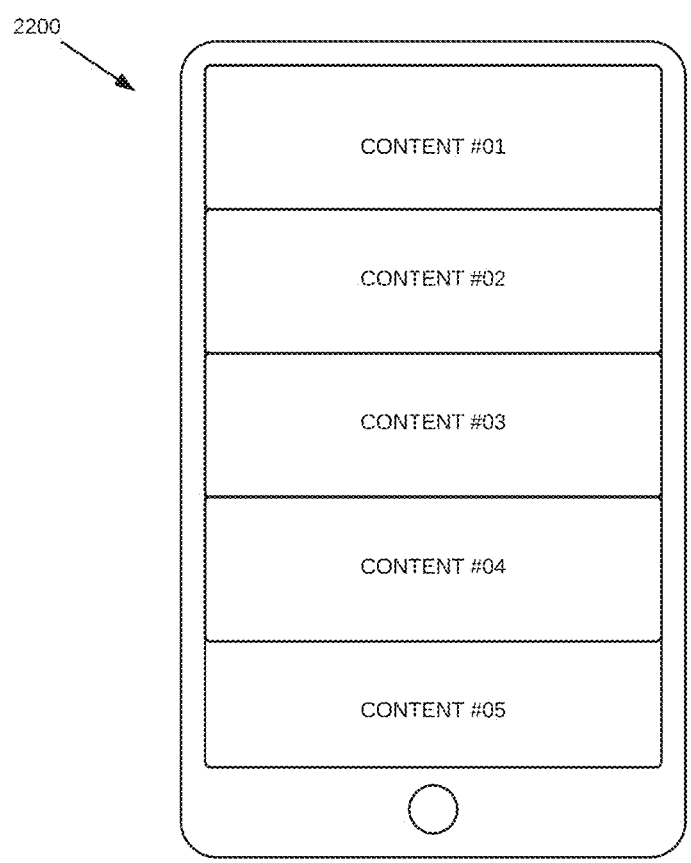
FIG. 22 is an example GUI of an App or API on a User Device for viewing all Content which User Devices have satisfied the Retrieval Rules to access Content via User's Library via App.

FIG. 22 illustrates one example GUI of an Apps interface on a User Device for viewing a User Library of Content. In this example, the Content listed is only the Content which the User Device has satisfied the Retrieval Rules for. For example, if a User Device's Geolocation satisfies all Retrieval Rules of a particular piece of Content, that Content may then be part of the User's Library. If the User Device's Geolocation changes and it no longer satisfies the Retrieval Rules of the Content, the Content may still be available in the user's User Library so long as the Content allows for storage in User Library. Referring back to FIG. 19, assuming 1802, 1804, 1806, and 1808 all allow for User Library storage, the User Path 1810 would satisfy the Retrieval Rules of 1802, 1804, and 1808 (assuming all associated Retrieval Rules required are otherwise satisfied and these items would be available in the user's User Library. Content 1806 is not satisfied, and therefore is not available in the user's User Library. Thus the systems and methods of the present invention may limit whether Content is accessible and Retrievable only when a User Device is within the Retrieval Range and otherwise satisfies the required Retrieval Rules, or whether Content is accessible and available to users after a user leaves the Retrieval Range and/or otherwise no longer satisfies the Retrieval Rules on a user's User Library.

In addition, additional Content may be retrievable or presented to users after the user leaves a Geo Place or Event, or Retrieval Range, as provided herein. Thus, the systems and methods of the present invention may provide further additional Content to only those that attended the Geo Place or Event. Specifically, the systems and methods of the present invention may store the Geo Places and Events visited, and provide the additional Content based on the user's prior attendances and geo coordinates. For example, an Event planner may wish to reward attendees by providing them with, features, bonuses, Content and additional Content, but only to those that attended; these maybe unlocked while attending and/or after attended. Likewise, information concerning the Geo Place or Event may only be provided to those that attended the Geo Place or Event, as desired by the Event planners. The intention is to reward users with content, bonuses and features if a user physically attends an event and/or activity The systems and methods of the present invention may have other features known as "social networking" functionality, including but not limited to the following. Specifically, an App may include a "chat" feature that allows users the ability to chat with other users, Admin the APIE and/or outside parties as they are using the App or third party interfaces. An "invite" feature may be included that may allow a user to invite others to a particular Geo Place, Geolocation or Event, which may include many Geo Places that form, in effect, a "Geo Fence", to utilize Content during an open or a specified time period. The invited users may be able to accept, maybe, deny, visit on their own, or propose another time to meet.

In addition, a user may publish information concerning an upcoming Event, or may publish information concerning a GeoPlace or other Geolocation, whereby others may request to receive an invitation to the Event. The information about the Event may be limited, so that others will not know at what location the Event will occur. After other's request an invitation, the user who created and published the Event can select among those that requested to send specific invitations thereto. At that time, the user who created the Event may provide details about the Event, such as location and/or time information to the invitees. Moreover, the user who created the Event may continue to withhold information until he or she chooses to inform the invitees, such as on the day of the Event.

Additionally, a "popularity" feature may be included that allows a user to follow and to provide information on the activity of another user, Content, Geo Place, Event or general Geolocation. Once the user is provided the rights to follow, the user may be notified of changes and/or interact therewith. Moreover, the user may be given a "thumbs up" or "thumbs down" feature that allows the user to rate Content, Geo Place, Event, or other portions thereof.

In addition, a "sharing" feature may be included that allows a user to share Content, Geo Place, Event, notification, or another aspect of the system disclosed herein.

Preferably, a user of the present invention may be notified of others that have certain interests or commonalities, thereby driving social interaction between users of the present invention. For example, a user may be notified of the numbers and/or identities of others that may visit a Geo Place or an Event, and allow the users having this commonality to contact and correspond together. The connection may be made based on one or more of several parameters, such as, for example, whether the user knows the other users, whether the user has correspondence or communicated with the other users in the past, whether users unknown to each other visit the same or similar Geo Places and/or Events, whether the users have certain contacts or "friends" in common, etc. The system of the present invention may recognize that users have commonalities based on these parameters, and other like parameters, and may send messages to users informing the users of these commonalities with other users.

Specifically, the system of the present invention may create a so-called "Nexus" or a score for a user relative to other users, and may connect the user with other users utilizing the Nexus. For example, a Nexus between user 1 and user 2 may increase when the system recognizes that user 1 and user 2 have visited the same Geo Places and/or Events, either at the same time and/or at different times. The system may contact user 1 and user 2 to inform them of this commonality when the Nexus score between user 1 and user 2 reaches a certain, pre-defined threshold value. It should be noted that any parameter may be utilized to increase or decrease a Nexus score between users, and the invention should not be limited as described herein.

For example, user 1 and user 2 may be physically located at a Geo Place or Event at the same time. Because of certain commonalities that are tracked by the system of the present invention, the Nexus score between user 1 and user 2 may be relatively high. Specifically, user 1 and user 2 may have previously corresponded with each other, may be recognized as "friends" within the system or within another social networking platform, such as Facebook, may have visited other Geo Places or attending other Events, either at the same time or separately, etc. The Nexus between user 1 and user 2 may reach the threshold value, and the system of the present invention may inform both user 1 and user 2 that the other is at the same Geo Place and/or Event at the same time, and may further help to guide the users together so that they can physically interact with each other.

A user's Nexus score may further be enhanced based on other factors. For example, a user may invite "friends" to activities, and thus the Nexus score may be weighted or otherwise increase based on this connection. Specifically, a user may invite a person to an event or activity, as described herein, through the App via SMS, for example. The System of the present invention thus marks that a stronger connection than other types of invites and collectively adds a connection to those users between Nexus and friends. The System of the present invention may automatically deem users friends based on their connections and how they may be invited to events or activities. All other invitees before gaining a status of Nexus or Friends may simply be inviter and invitee.

The systems of the present invention may allow for specific data mining features that may allow the systems of the present invention to actively track and predict a user's interests. From there, the systems of the present invention may utilize the information to present certain content to the user based on the predicted interests. Specifically, because the user actively engages geofences when attending Events or visiting GeoPlaces, certain information may be gleaned from the user's engagement with the Event or GeoPlace. Specifically, the systems of the present invention may track and save information concerning what activities the user attends or visits at Events or GeoPlaces, when he or she attends and for how long, with whom he or she attends with, what the user does during the attendance of the Event or visiting of the GeoPlace, who else may be there and what interest others may have. With respect to information gleaned from other individuals, it may be possible to determine a user's interests if he or she shares common features or traits with others that also attend Events or visit Geo-Places. Of course, the user may be provided with settings or policies that he or she may set regarding the tracking of his or her interests by the systems. Likewise, systems of the present invention may also glean negative information concerning activities based on attendance or visits to Events or GeoPlaces relating to what the user is not interested in. Both positive and negative interest information may be utilized by systems of the present invention to obtain a user's interests for possible content presentation, as detailed below.

Interests may also be generated, identified, and/or weighted based on post-activity (after attending or while attending an activity) or post-event (after attending or while attending an event) questionnaires that may be presented to a user during and/or after an Event or attendance at a Geo Place. The questionnaire may be presented to the user to obtain how much interest the user may have in the Event or Geo Place. The post-activity questionnaire may request ratings or rankings of events/activities, and the value and accuracy of each interest for such event/activities to user and also the relevance of interests to such event/activities. The post-event questionnaire may request ratings or rankings of events/activities, and the value and accuracy of each interest for such event/activities to user and also the relevance of interests to such event/activities. The questionnaires may be presented to the users for tracking of interests, and may be utilized for tracking Events or Geo Places that users may be interested in, and their relative interests in these Events or Geo Places, but also the System may then track Events or Geo Places that a user may be disinterested in, or even dislike, and the relative disinterest or dislike associated with those Events or Geo Places. This tracking shall utilize other System algorithms along with information such as time, location, social connection and learned data. The System of the present invention may incentivize the constant updating of his or her interests by providing advantages or other incentives to do so. The relative interests or disinterests may be utilized by the System herein for matching Events and Geo Places with the users or for matching other users with the user based on these.

Interests may be identified, named and stored by the present invention and associated with the user after they are generated and/or identified. The interests may become part of the information stored by the present invention and associated with the users, and may be private (i.e., not seen or discerned by some or others) or public (discoverable by other users). Preferably, interests generated, named, identified and associated with users may be public so that others can discover or see user's interests, but may be selected by the user as being private if the user so chooses. Such public interests can be determined a common interest with a plurality of users if applicable. Private interests may be shared to other users who attend events/activities that include such private interests, and once attended these private interest may become part of the profile of the attended user. The System of the present invention may utilize the private interests for contacting others that have the same title and descriptions of other private and/or public interests.

An "influence" may be an element that may influence a user's interest in a particular Event, Geo Place or other activity. Specifically, the present invention may track elements that may be present at Events, Geo Places or other activities that can influence whether or to what degree the user may have an interest in the Event, Geo Place, or other activity. Elements such as the actual physical geo-location and attendance at Events, Geo Places, or other activities, and/or how many times the user may attend or visit the Event, Geo Place or other activities, the identification of others that may have also attended Events, Geo places or other activities, and other like elements. An "Influence" may be utilized to identify what influences a user to engage with another user or engage, mark to attend or attend an activity/event; and further the value of the interests that are part of the activity/event. "Influence" also takes in to account the social connections, Nexus, and that may contribute, along with times, dates, locations and all combinations of such over evolving (continuously learning) algorithms.

The information gleaned from a user based on Events attended and GeoPlaces visited, as well as the ancillary information gleaned from that visit may be used to push content to the user based on his or her interests, as determined by the systems of the present invention. In addition, certain content may relate to multimedia data presented to the user. In addition or alternatively, content presented to a user based on his or her interests, as gleaned by the systems of the present invention, may be brand related.

In an example, a user may create an Event or define an activity using the systems and methods of the present invention, such that the Event or activity may be populated with the present invention and accessible to others in the manner described herein. Specifically, the user may provide information concerning the Event, such as location, date/time, or other related information. With an activity, the user may define generally what he or she would like to do, without specifying a particular Event. Specifically, the user may create the activity with the present invention by specifying that he or she wishes to attend a concert, a movie, or other activity at a certain date/time and general location. Therefore, a user may wish to include or invite others, and which may share his or her interests based on the type of activity, as opposed to a specific activity already defined. The System of the present invention thus may allow a user to generate activities for themselves, and their social network based on connections generated herein may allow others to partake in the activities, thereby creating new opportunities available on demand to any user on platform.

Therefore, the user may create a type of activity, known as "Let's Do This" activity or event in the present invention (hereinafter, "LDT Event" or simply "Event") using an "LDT Module." The user may define when, where, what, and with whom. Specifically, the user may define specific dates, times, or may generally define dates and times without specificity, which includes allowing the invited/included group to decide on the times and dates of the Event. Moreover, the user may define specific locations or general locations and areas for the type of Event, such as locations near the user, near another user, near a central location, near a point of interest, anywhere or in any other location, which includes allowing the invited/included group to decide on the locations. Finally, the user may define the activity based on the type of Event (through interest selections) without specifying the precise activity, or may choose to select a specific activity interest, which includes allowing the invited/included group to decide on the adding more users to the Event. Thus, the user may specify, using the systems and methods of the present invention, a Geo Place and/or an Event that may be accessible and attended by other users, as described herein. The user who creates the LDT Activity is known as the "LDT-Creator" and LDT-Creator may change the selections for the when, where, what and with whom at anytime through the LDT Module. The recipients of the LDT Event information may be known as "LDT-Recipients". The LDT-Creator may place a minimum and/or maximum attendance allowed. LDT-Creator can add other requirement for invited/included users to act on or complete in order to attended, such as participation in deciding on activity details or inviting others, or sharing with other to attend.

The user may further provide information on who he or she wishes to invite/include to the Event. The user may invite any person, only known friends, those who share interests, or those that share Nexus scores. For example, the user may select one or more particular interests associated with the user to invite only those that share the one or more particular interests. The user may further send invites to others outside of the systems and methods of the present invention, such as via email, social networking applications, text message, through other social networks, through other electronic means, or other like communication platforms, to ensure that those that may be offline from the systems and methods of the present invention, receive the invite. The user may further define the minimum and/or maximum number of people invited, may provide further custom details.

Figure 23:
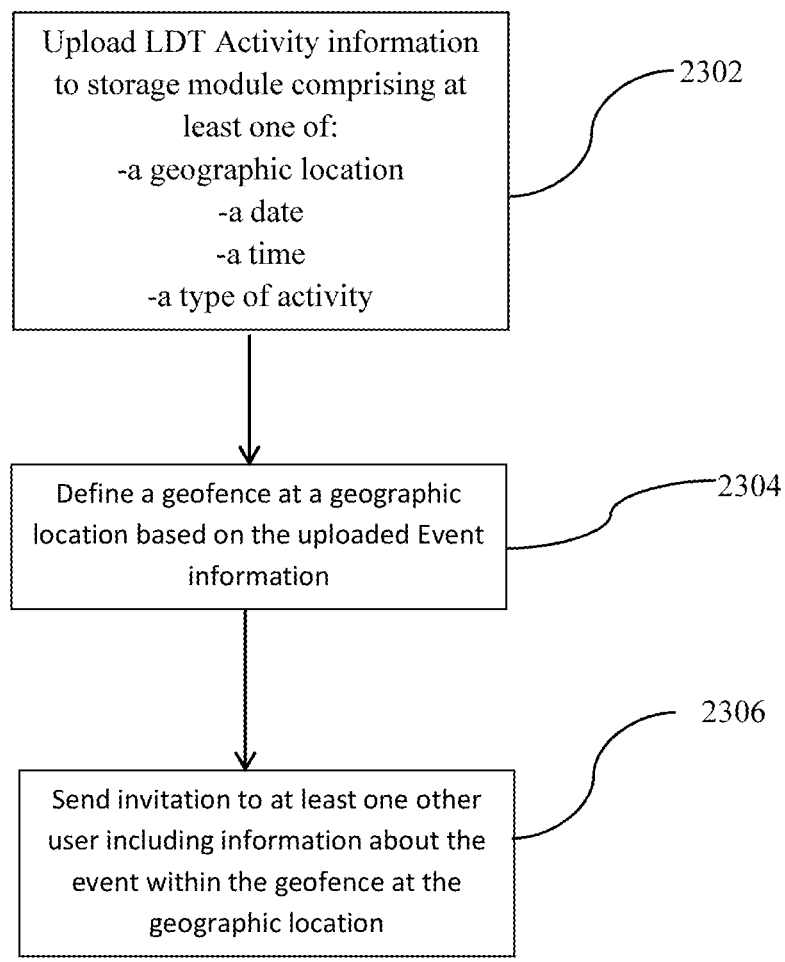
FIG. 23 illustrates a flow chart for utilizing a "Let's Do This" feature in an embodiment of the present invention.

FIG. 23 illustrates a method of the present invention including steps that may be utilized to create an LDT Event according to the present invention. In a first step 2302, information concerning an LDT Event may be uploaded to the present System by a first user using a computing device. The information may include at least one of a geographic location, a date, a time, and a type of activity, and along with at least one other user or non-user. Preferably, the information may include information on two or more or all of the parameters defined. The System of the present invention may utilize the information, via step 2304 to define an Event and define a geofence for the Event based on the geographic location thereof. The Event may be based solely on information from the first user, or the first user may request other users' input on determining the Event decisions: its location, its date and time, invitees/included, and other elements of the Event. Finally, the System of the present invention may invite at least one other user or non-user via step 2306 to the defined Event, and may further track the attendance at the defined Event based on the first user and the at least one other user's physical presence at the Event.

The at least one other user or non-user may be invited by the first user directly, or may be generated and invited by the Systems of the present invention based on Nexus, Social and interests associated with the at least one other user. For example, the other user or users may be invited based on interests they have previously defined, "Influence" or based on other Events that they may have attended in the past. Likewise, other users may be invited based on how closely their previously defined interests are to previously defined interests of the first user, even if the first user has never met the other users previously. Thus, the system may be utilized by users to interact with prior strangers based on their shared interests.

The LDT-Creator can select to make the LDT shareable by the recipients who are invited, meaning these recipients can share with their recipients and then those recipients can also share and this continues. In the alternative the LDT-Creator may also lock the sharing; therefore only those invited by LDT-Creator may attend. LDT-Creator may also choose to require recipients to partake in suggestions or comments in order to secure the ability to attend. The LDT Module therefore becomes a collaborative platform to define an Event amongst its recipients to decide on the when, where and what, and accordingly with whom, which may allow control to the LDT-Creator to make the final selections. Alternatively, the LDT-Creator may define an LDT Event requiring a group decision to be made allowing input from all LDT-Recipients. The LDT Recipients may also be given the right to select the final decision for the what, when, and/or where based on settings from the LDT-Creator.

Other users of the present invention may be invited to attend or may otherwise discover the Event, or otherwise access information on the Event based on shared interests with the user who generated the Event or defined the general activity. Of course, other factors may be utilized for matching Events with other users, such as location, date/time, shared social connections, learning user behaviors, predictive algorithms, or other like parameters, and the invention should not be limited as described herein. For an Event, users that match interests with the user that generated the Event, for example, may be provided with the ability to indicate whether he or she will attend the Event. Moreover, users that are matched based on interest matching algorithms and along with other algorithms (such as: based on location, time, social connections, interests ratings and more) with the user that generated the general activity may be connected so that they may communicate with each other to further define the Event. For example, if a user wishes to attend a movie, and his or her interests indicate that he or she likes to attend action movies, then others that share his or her interests may be connected thereto and allowed to communicate with each other so that an Event can be defined, such as attending a particular movie at a particular date/time. Thus, users that may or may not know each other can collectively create Events based on their shared communication generated by their shared interests.

Thus, invitees may be generated by the systems and methods of the present invention based on specific invites from the user, or through interest matching and/or Nexus, as described herein. Those that are matched are provided an invite and an ability to accept, decline or other like notification, such as "opt-in", "opt-out", "may attend", "contribute financially" or "see others attending" before making decisions. Further, as noted above, those who are invited may contribute by participating to determine decisions of the Event.

In another embodiment, brands may be identified as of particular interest to a user based on attendance at Events or GeoPlaces. For example, if a user attends a plurality of National Football League ("NFL") games at a stadium, then the systems of the present invention may glean or infer that he or she has a particular interest in the NFL, and may be able to generate specific content for the user based on this gleaned interest, or may present to the user Events or GeoPlaces to the user based on this interest, such as, for example, an NFL themed party. Thus, the systems of the present invention may glean specific brand-specific information of interest of a user.

Brands may further utilize the information gleaned by the systems of the present invention to provide specific brand-related content to the user. For example, a brand may set up specific Events or GeoPlaces that relate to the brand, and may offer incentives to users based on if they attend, when they attend, how long they attend, and other like factors.

In addition, the systems of the present invention may allow a user to track information concerning another individual that may utilize the systems, as described herein. For example, if a user wishes to track the location and, specifically, Events and GeoPlaces visited by another user, the user may do so, assuming that the other user allows this type of tracking. Oftentimes, individuals that users are interested in tracking or connecting with may be "influencers", having their own interests that may be apparent to users that track or connect with them. Oftentimes, another user may actively promote a particular brand, or an Event, or a GeoPlace, and if the user follows this other individual, information concerning the user's interests can be gleaned based on the user's tracking or connecting with the other individual. Content may be generated or provided to users, therefore, based on other user's interests or promotion if the other user is tracked or connected to the user.

User interests, as gleaned by the systems of the present invention, may further be utilized to aid a user as he or she visits an Event or a GeoPlace, or simply visits a location that is not a specific Event or GeoPlace. For example, a user may vacation in a geographic location and may wish to try things, such as attending Events or visiting GeoPlaces of which he is unaware. The user may request that the systems of the present invention design an activity schedule based on attending Events or GeoPlaces, or other like locations, that may match a user's interests. Specifically, a user may request that the system plan a day of activities in a city that the user has little knowledge of. The system may utilize the interest information gleaned based on the user's past activities, and may schedule a day of activities for the user to do.

Likewise, instead of basing a schedule of events on the user's interests as gleaned by the systems of the present invention, as described above, the user may set a particular goal, or may present specific information concerning what he or she may wish to do to the system, and the system may design a schedule of events based on that stated goal or other information. For example, although a user may not have provided past interest information relating to English Premier League soccer, a visitor to London may wish to partake in attending events relating to the English Premier League and may express that goal to the systems of the present invention, which may then design a schedule of Events or GeoPlaces, or other locations, based on this goal for the user.

The user may further be provided with the ability to easily generate Content, such as by providing the user, via the App, with Instant Video, Instant Picture (or Photo), Instant, Audio, or other Content generating features (such as URL capture, screen capture, or the like).

A user of the system of the present invention may have specific camera controls, such as for taking photographs and video, as desired. Specifically, the system of the present invention, either by itself or in conjunction with the other features described herein, may obtain access to the camera features of a user's mobile device, and provide specific functionality. In a first embodiment, a user may be presented with a "camera option" to take a photograph. As the user selects an icon or otherwise selects to activate the camera functionality of his or her mobile device, the system of the present invention may immediately begin to record video, from the moment the camera feature is activated to when the still photograph is taken. Once the still photograph is taken, the user may be presented with options to review, save or delete the video taken when the camera was activated up to the time the still photograph is taken. Thus, a user may capture candid moments otherwise not captured. Therefore, the user may wish to save the video file recorded, or at least a portion thereof, and share it with friends through social networking sites, or directly with others.

In conjunction with the embodiment described above, the system of the present invention may also continue recording for a particular period of time after a still photograph is taken. The system may further provide an option to a user to review, save and/or share an automatically-created gif file that may be generated from several seconds prior to the still photograph to several seconds thereafter. In a preferred embodiment, the system of the present invention may automatically generate a gif file of five seconds prior to a still photograph being taken and 3 seconds after the still photograph is taken, although it should be noted that any period of time prior to and after a still photograph is taken may be used to automatically generate a gif file.

Moreover, the system of the present invention may process the gif file that is automatically created to create a processed version of the gif file. Specifically, the system of the present invention may analyze the gif file and identify individuals, animals, moving items, and other like subjects within the gif file that may have movement associated therewith. The system of the present invention may select boundaries of the subjects within the gif file and exaggerate the movements of the subjects. Therefore, the gif file, while originally created from an actual event, may turn the actual event into a processed event, having accelerated movements of subjects therein, to create funny or otherwise engineered situations. Users may be presented with options to save, delete, or share the automatically-created gif.

Photographs that may be taken with a user's smart phone or other mobile device may typically be of individuals that may be together at an Event or within the same GeoPlace. The systems and methods of the present invention may identify the individuals that may be part of a photograph based on a number of factors, including facial recognition sensors and other like sensors. Moreover, in a preferred embodiment, because the systems of the present invention can track individuals, based on their presence at an Event or within a GeoPlace, the systems of the present invention may utilize the information to identify individuals in photographs.

For example, a user may take a photograph with one or more others who are at an Event or GeoPlace utilizing the systems and methods of the present invention. Because the systems of the present invention know who is present at an Event and/or GeoPlace, the time that they are in attendance, and/or their location during the time they are present at the Event and/or GeoPlace, the system can utilize the information to identify those in attendance in the user's photograph. Specifically, the systems of the present invention may determine a time the photograph was taken, and the individuals in proximity to the user at that particular time to aid in identifying whether the individual or individuals are in the user's photograph.

Therefore, based on the individuals' geolocation at the Event and/or GeoPlace, and in conjunction with other sensors, the systems of the present invention may automatically identify the individuals in the photographs. Options may be available allowing the user to verify the identity, or be presented with possible matching identities so that the user may select the identities of those captured in the photograph.

The systems and methods of the present invention allow precise tracking of users at Events and/or Geo Places. Specifically, because the systems and methods of the present invention track user's location, via their smart phones or other like devices, the systems and methods can determine the number of users at an Event or Geo Place at any time. Users that create Events may wish to know how many attendees may be present at an Event, and this information can be provided to them, or to anyone else. For example, a user may create an Event page that may be viewable by users of the present system, in which the attendance can be displayed to viewers. The attendance data may be presented as "total attendance", "peak attendance," "average attendance," and/or attendance at any particular time or times. This is useful because the systems and methods of the present invention may track "actual" attendance precisely instead of "estimated" attendance. Of course, the attendance data may be provided to any user in any form, and the present invention should not be limited as described herein.

In addition, because attendance at a Geo Place or at an Event can be precisely monitored, it may be desired to set up a payment transaction when a user crosses a geofence. Specifically, a user may be invited or otherwise wish to attend an Event or physically travel to a Geo Place, and the Event or attendance at the Geo Place may require a payment to attend. Once the user crosses a geofence to attend an Event or visit a Geo Place, then the system of the present invention may run a payment transaction for a certain fee. This payment transaction may be automatically done once the user crosses the geofence and attends the Event or visit the GeoPlace.

Alternatively, the payment may be presented to the user as an option once the user crosses the geofence to accept or decline the payment. Alternatively, a user may be presented with a warning that payment will be deducted once the user crosses an approaching geofence, and if he or she does not intend to attend the Event or visit the GeoPlace, then he or she may change course to avoid the geofence. Payment, whether warnings provided when approaching a geofence, or whether automatically processed upon crossing a geofence, may be selected by a user in settings or policies that the user may set for his or her account.

The user's smartphones that are used to track the user's location may be utilized for authentication of transactions, offering enhanced security for the transaction. Specifically, transactions within an Event attended or at a GeoPlace may be authenticated using the user's smartphone and location tracking. Specifically, if a user attends a concert, for example, and wishes to purchase a t-shirt at the t-shirt booth, the transaction may be done through the systems of the present invention, and the user's smartphone may add a level of security because the user's payment information may be tied to the smartphone, and the smartphone may be easily tracked via the systems of the present invention.

In another example, a user of the systems and methods of the present invention may purchase products or services from a retail establishment using a cashless system, as provided by the present invention. Specifically, the user may, for example, select items in a retail store and add those items to a basket, a bag or a cart that may be tied to the user. More specifically, the basket or bag may have a unique identifier that is associated with the user, such as when the user enters the store and selects the basket, bag or cart having the unique identifier. The user may scan or otherwise input the unique identifier into the application of the present invention to associate the user with the basket, bag or cart. Items for purchase may be placed within the basket, bag or cart having their own unique identifiers, such as UPC codes, other like codes, or other trackable elements (electronic, sensor, magnetic, etc). The present invention, therefore, may be utilized to track or otherwise receive the unique identifiers of the products stored within the basket, bag or cart. Therefore, the present invention may keep an inventory of items intended for purchase. Alternatively, the items may be brought to a "purchase location" and scanned by a cashier or via self-serve scanning, automatic checkout. When the user enters the purchase location, exits the store, or otherwise enters a region signaling the user's intention to purchase, which can be set up as a Geo Place, according to the present invention, the user may use the present invention to facilitate the purchase transaction. Upon entering the purchase area Geo Place, the present invention may automatically process the transaction with the tracked or identified inventory of products, or may present purchase options to the user. The user may have pre-entered money in his or her account to utilize for the transaction or may opt to automatically or manually use another purchase option, such as bank transfer or credit card. Loan options may also be presented to a user for purchasing goods using the present invention. The confirmation of the user's device, interaction with invention, additional interactions required by user (password, questions, etc) confirm the accuracy of the purchase.

Transactions provided by the present invention may have heightened security. As noted above, utilization of tracking means according to the present invention may be utilized to authenticate the user for the transaction. For example, a payment transaction that occurs outside of the user's present location, as tracked by the systems and methods of the present location, may be flagged as being fraudulent because the transaction occurs away from the user's present location. Likewise, transaction may have additional security, including unique transaction codes tied to both vendors and users, the entering of vendor and user identifiers to start transactions, especially if tracking is down, additional credential requirements to facilitate transactions besides tracked location, storing of transactions and user identity information at time of purchase, and other like additional security mechanisms. Moreover, users can set purchase limits and auto-load money features to ensure that money is available for purchase. System can also provide user spending habits and data for better behaviors. Likewise, as noted above, lenders can become tied to the systems and methods of the present invention to provide loans to purchases as needed. The combination of user's preferences, data of behavior, possession of device's Geo location, additional prompted questions and other electronic security device connections the security and accuracy is enhanced for User, Merchant and Credit card issuers and banks.

Another form of transaction can occur using the systems and methods of the present invention. Specifically, the systems and methods of the present invention may be utilized to drive consumers to purchase locations as a form of marketing. Because the present invention may utilize user tracking information, a geofence may be placed around a vendor's store and users of the application may be tracked as they enter the store. Thus, the systems and methods of the present invention can automatically and immediately track customers that enter the retail store. The vendors may utilize this information to pay for this marketing. For example, a program designed to drive consumers to a vendor's retail establishment may be paid for by the vendor to the facilitator of the program (the advertiser or marketer) based on a "pay per arrival" ("PPA") method, meaning that the vendors only pay the advertiser/marketer based on the number of users actually cross the geofence and enter the retail store. Each time a user or non-user arrives at such location, with matching interests, social connections and influence the payment is due based on results.

The marketing program may be defined by the vendor using the systems and methods of the present invention. For example, the vendor may define specific information relating to potential consumers, such as their interests. The interests may be used to match with consumers or potential consumers having matching interests as defined by the vendors. The systems and methods of the present invention may provide suggestions to the user based on the matches, thereby potentially driving the consumers to the retail store. Once a user, having been matched to the vendor via their interests, crosses the geofence into the vendor's store, then the vendor may be charged for use of the systems and methods to obtain the customer. As noted above, interests may be tracked, analyzed, and determined based on user input, activities and Events attended, or other like methods as described hereinabove.

The present invention may also provide conversion metrics to businesses based on data from payment processors, credit card merchants, credit card issuers, banks, and other services, and to include integrations with the businesses themselves, POS systems or other software and hardware within the business.

Geo Places and/or Events may typically have several individuals that are utilizing a network for uploading and downloading data. The network may typically be in the form of a Wi-Fi network, a cellular network, or any other wireless network apparent to one of ordinary skill in the art. It is often the case that when a large number of individuals are together in the same place, such as in a Geo Place or at an event, the wireless network may become bogged down and sluggish, thereby preventing users from utilizing the wireless network for social networking or for other elements provided herein by the system of the present invention. In an embodiment of the present invention, a user of the system, such as an individual or organization that has created a Geo Place and/or an Event may wish to control a network, adding bandwidth when needed. Therefore, in an embodiment of the present invention, the system of the present invention may allow a user to ping the wireless network, such as the Wi-Fi network, using the frequency of the wireless network. An initial signal sent at the same frequency may be sent out and subsequently retrieved by the user and evaluated to determine the number of unique users on a wireless system, or an approximation of the number of unique users on a wireless system.

Specifically, information would be necessary to determine at which frequency to send out the initial signal. For example, knowing the make and model of a Wi-Fi wireless router would allow a user to manually select the particular frequency at which to send the initial signal. The subsequently retrieved signal could be compared against the initial signal, or against a database, to determine the number of unique users on a Wi-Fi network. Alternatively, the system of the present invention may automatically determine the make and model of the wireless network by sending an identification signal and determining the frequency at which the wireless network is transmitting and receiving. Once identified, an initial signal, as described above, may be sent to interact with the wireless network signal, and the number of unique users on the wireless network may be identified.

Once it is determined how many users are on a wireless network, a user may be able to better control access to the wireless network, allow additional routers to be utilized, if necessary, turn routers off, if necessary to save cost, or for any other purpose.

In addition, in an alternate embodiment of the present invention, a user may be provided the ability to define or create an Event, where a plurality of Geo Places may be defined and associated therewith. The user may further be provided the ability to create an Event without physically being present in a particular Geolocation, and further the user may have the ability to control the Event created, such as providing specific Rules for Placement of Geo Places and other like control features.

User's attending an Event or visiting a GeoPlace that may have a discrete network, such as a wife network, a Bluetooth network, or other like network, may allow a user to track his or her location within that Event or GeoPlace that may be provided by the Event or GeoPlace, even when a connection with the internet is unavailable, which may happen within certain buildings. Specifically, sensors may be utilized to allow tracking of the user's smartphone. A local map may be provided and the sensors may be utilized to track the user's location on the local map.

In another embodiment of the present invention, certain features tied to the physical mobile device, such as the user's smartphone or the like, may be utilized by the present invention for additional functionality. For example, mobile devices typically include accelerometer, gyrometers or other like motion sensors. A user may require help when using the systems and methods of the present invention. A dynamic interactive tool may be utilized to signal to the systems and methods of the present invention that the user needs help in some manner. For example, the user may wish to obtain help by accessing a help screen and may easily do so simply by shaking the mobile device. Of course, other functionality may be tied to the mobile device based on shaking the same, and the present invention should not be limited as defined herein. Moreover, the systems and methods of the present invention may be able to discern simple "jostling" of the mobile device from actively shaking the same when the user desires help. Type of Shake and its length, manner and style can generate different responses and regardless the responses can vary based on user, screen, and many other factors.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:

1. A method for connecting users attending events at geographic locations comprising:
   providing a server comprising an application interface engine and a storage module, the application interface engine configured to communicate with a computing device, wherein the computing device is configured to upload, via a first user, to the storage module event information comprising the geographic location, a characteristic of the event, and at least one of a date, a time, and an activity;
   creating a geofence, via the application interface engine, at the geographic location based on the event information;
   providing a second user and a third user;
   attending the event by the second user;
   calculating a first rating of interest in the event of the second user based on the attendance at the event by the second user;
   calculating a second rating of interest in the event of the third user, wherein the second rating of interest in the event of the third user indicates that the third user has an interest in the event, wherein the second rating of interest in the event of the third user is based on the second user's interest in the characteristic of the event;
   matching the third user with the second user based on the second user's first rating of interest in the event and the third user's second rating of interest in the event;
   sending a first message to the second user indicating that the third user has the interest in the event; and
   sending a second message to the third user indicating that the second user has the interest in the event.

2. The method of claim 1 wherein the first and second messages are sent when the first rating of interest of the second user and the second rating of the interest of the third user each reach a predetermined value.

3. The method of claim 1 wherein the second rating of interest of the third user is calculated based on the third user's attendance at the event.

4. The method of claim 1 wherein the first rating of interest of the second user and the second rating of interest of the third user are combined to form a *nexus* score wherein the nexus score indicates a degree of common interest in the event between the second user and the third user.

5. The method of claim 4 wherein second rating of interest of the third user is calculated based on the third user's attendance at the event.

6. The method of claim 5 wherein the first rating of interest of the second user is further calculated based on the second user's interests and further wherein the second rating of interest of the third user is further calculated based on the third user's interests.

7. The method of claim 1 further comprising the steps of:
   attending the event by the third user, wherein the first message communicates to the second user that the third user is attending the event while the event is occurring, and further wherein the second message communicates to the third user that the second user is attending the event while the event is occurring.

8. A method of connecting users based on interests comprising the steps of:
   providing a server comprising an application interface engine and a storage module, the application interface engine configured to communicate with a computing device, wherein the computing device is configured to upload, via a first user, to the storage module information comprising at least one of a geographic location, a date, a time, and an activity thereby defining a geolocation, the geolocation further comprising a characteristic;
   creating a geofence, via the application interface engine, at the geographic location based on the information;
   providing a second user;
   calculating an interest in the geolocation of the second user wherein the interest in the geolocation is based on the characteristic of the event;
   inviting the second user to the geolocation if the second user's interest is above a predetermined value.

9. The method of claim 8 wherein the interest in the geolocation of the second user is calculated based on the second user's attendance at one or more prior geolocations.

10. The method of claim 9 wherein the interest in the geolocation of the second user is calculated based on activities at the one or more prior geolocations.

11. The method of claim 9 further comprising the steps of:
    identifying an influence at the one or more prior geolocations; and
    calculating the interest in the geolocation of the second user based on the influence at the one or more prior geolocations.

12. The method of claim 11 wherein the influence is selected from the group consisting of a person, geolocation, event and interest.

13. The method of claim 8 further comprising the steps of:
    providing social connections between the second user and one or more other users; and
    calculating the interest in the geolocation of the second user based on the social connections between the second user and the one or more other users.

14. The method of claim 8 further comprising the steps of:
    providing one or more traits of the second user;

providing one or more traits of one or more other users; and calculating the interest in the geolocation of the second user based on common traits between the second user and the one or more other users.

15. The method of claim 8 wherein the geolocation is a first event and further comprising the steps of:

providing a second event;

attending the second event by the second user;

providing a questionnaire to the second user after attending the second event wherein the second user answers the questionnaire, wherein the second event is prior to the first event; and calculating the interest in the first event of the second user based on the answers to the questionnaire by the second user.

16. The method of claim 8 further comprising the step of:

storing the interest in the geolocation of the second user.

17. The method of claim 16 further comprising the step of:

calculating an interest in in the geolocation of the first user, wherein the interest in the event of the first user and the second user is periodically updated with new information.

\* \* \* \* \*